US011423381B2

(12) United States Patent
Herrington et al.

(10) Patent No.: US 11,423,381 B2
(45) Date of Patent: Aug. 23, 2022

(54) MERCHANT DEVICES AND COMPUTER-BASED SYSTEMS INVOLVING COMPONENTS FOR MANAGING CASH TRANSACTIONS AT CASH-ONLY RETAIL LOCATIONS AND METHODS OF USE THEREOF

(71) Applicant: Capital One Services, LLC, McLean, VA (US)

(72) Inventors: Daniel Herrington, McLean, VA (US); Kevin Osborn, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/988,437

(22) Filed: Aug. 7, 2020

(65) Prior Publication Data

US 2022/0044220 A1 Feb. 10, 2022

(51) Int. Cl.
*G06Q 20/20* (2012.01)
*G07G 1/00* (2006.01)
*G07G 1/12* (2006.01)

(52) U.S. Cl.
CPC ......... *G06Q 20/206* (2013.01); *G06Q 20/208* (2013.01); *G07G 1/0018* (2013.01); *G07G 1/12* (2013.01)

(58) Field of Classification Search
CPC .. G06Q 20/206; G06Q 20/208; G07G 1/0018; G07G 1/12
See application file for complete search history.

(56) References Cited

U.S. PATENT DOCUMENTS 7,386,509 B1 * 6/2008 Swift .................... G06Q 20/04
705/39
7,595,816 B1 * 9/2009 Enright .................. G06Q 20/18
348/143

(Continued)

FOREIGN PATENT DOCUMENTS

DE 102011108482 A1 1/2013

OTHER PUBLICATIONS

"Cash Management Solutions". Retrieved from <http://www.scancoin.com/en/~/media/314454CF5C2E4693A37FFAC18A3514D1.ashx>. 2019. (Year: 2019).*

*Primary Examiner* — Nathan A Mitchell
(74) *Attorney, Agent, or Firm* — Greenberg Traurig, LLP

(57) ABSTRACT

Merchant devices, systems and methods designed to provide and/or process cash transactions for customers of cash-only retail locations without need for traditional ATMs. In one embodiment, an exemplary POS terminal device may comprise a housing, dimensioned to install at a cash-only retail location, the housing having a cash storage receptacle and a cash management component configured to handle electronic cash transaction requests, and a communication component configured to transmit the respective electronic cash transaction requests. Further, the cash management component may include a reader component for interacting with a transaction card and/or device of a customer, an authentication component configured to scan and authenticate cash bills, a cash bills intake component, and a cash bills dispensing component. Accordingly, cash-only retail locations may implement such specialized devices and process transactions in ways avoiding reliance on traditional ATMs, such as those leased from third parties.

20 Claims, 13 Drawing Sheets

(56) References Cited

U.S. PATENT DOCUMENTS

| | | | | |
|---|---|---|---|---|
| 8,688,579 | B1* | 4/2014 | Ethington | G06Q 20/042 |
| | | | | 705/42 |
| 9,600,981 | B2 | 3/2017 | Korala | |
| 10,521,814 | B1 | 12/2019 | Collins et al. | |
| 2002/0138424 | A1* | 9/2002 | Coyle | G06Q 20/28 |
| | | | | 705/39 |
| 2002/0198799 | A1* | 12/2002 | Burden | G06Q 30/0234 |
| | | | | 705/35 |
| 2004/0220859 | A1* | 11/2004 | McGunn | G07G 1/0036 |
| | | | | 705/16 |
| 2004/0222283 | A1* | 11/2004 | Mastie | G06Q 20/40 |
| | | | | 235/379 |
| 2004/0249718 | A1* | 12/2004 | Kuroda | G07F 5/24 |
| | | | | 705/17 |
| 2005/0131821 | A1 | 6/2005 | Eberhardt | |
| 2007/0000996 | A1* | 1/2007 | Lambert | G06Q 20/387 |
| | | | | 235/380 |
| 2009/0012901 | A1* | 1/2009 | Singh | G06Q 20/322 |
| | | | | 705/67 |
| 2009/0089205 | A1 | 4/2009 | Bayne | |
| 2009/0171825 | A1* | 7/2009 | Roman | G06Q 20/042 |
| | | | | 705/35 |
| 2011/0195775 | A1* | 8/2011 | Wells | G07F 17/3223 |
| | | | | 463/29 |
| 2011/0246278 | A1* | 10/2011 | Kubo | G07F 19/202 |
| | | | | 705/14.25 |
| 2014/0252089 | A1* | 9/2014 | Bostwick | A47F 9/04 |
| | | | | 235/383 |
| 2014/0253750 | A1* | 9/2014 | Kwan | G06K 9/6202 |
| | | | | 348/222.1 |
| 2017/0221038 | A1* | 8/2017 | Yasui | B41J 11/0075 |
| 2017/0256142 | A1* | 9/2017 | Oe | G07D 11/34 |
| 2018/0197157 | A1* | 7/2018 | Magee | G06Q 20/1085 |
| 2020/0410826 | A1* | 12/2020 | Kurotsuka | G07G 1/00 |
| 2021/0004778 | A1* | 1/2021 | Kurotsuka | G06Q 20/1085 |
| 2021/0056795 | A1* | 2/2021 | Recine | G06Q 20/204 |
| 2021/0133717 | A1* | 5/2021 | Inokami | G06Q 20/227 |

* cited by examiner

MERCHANT DEVICES AND COMPUTER-BASED SYSTEMS INVOLVING COMPONENTS FOR MANAGING CASH TRANSACTIONS AT CASH-ONLY RETAIL LOCATIONS AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to improved merchant devices (e.g., point of service or point of sale (POS) terminals), improved computer-based platforms or systems, improved computing components and/or improved computing methods configured for one or more novel technological applications involving a housing installed at a cash-only retail location and cash management components configured to handle cash and perform cash-based electronic transactions and/or processing.

BACKGROUND OF TECHNOLOGY

A computer system may include a group of computers (e.g., clients, servers, computing clusters, cloud resources, etc.), merchant or POS devices, and other computing hardware devices that are linked and communicate via computer architecture, communication components, and/or software applications associated with electronic transactions, data processing, and/or cash management.

Overview of Described Subject Matter

In some embodiments, the present disclosure provides various exemplary technically improved POS terminal devices for use in cash-only retail locations, such POS terminal devices comprising, for example, elements such as:
a housing, comprising:
a cash storage receptacle configured to store authenticated cash bills received at the cash-only retail location;
a cash management component comprising:
  a reader component for interacting with a transaction card or a transacting device presented, by a respective customer of a plurality of customers of the cash-only retail location, at the POS terminal device to allow to the customer to submit or withdraw the authenticated cash bills so as to deposit a corresponding monetary amount to or withdraw the corresponding monetary amount from a respective customer account associated with the respective customer at a respective financial entity;
  a cash bills intake component, configured to receive or expel cash bills;
  an authentication component configured to scan, authenticate, accept and reject cash bills so as to confirm that the cash storage receptacle houses only the authenticated cash bills;
a cash bills dispensing component, configured to dispense the authenticated cash bills;
wherein the cash management component is configured to:
  receive a respective cash withdrawal request or a respective cash deposit request from the respective customer of the plurality of customers of the cash-only retail location,
  generate a respective electronic cash transaction request based on the respective cash withdrawal request or the respective cash deposit request,
  cause to transmit the respective electronic cash transaction request, through a computer network, from the POS terminal device to an electronic account management computer associated with the respective financial entity,
  receive a respective cash transaction approval from the electronic account management computer associated with the respective financial entity based on the respective electronic cash transaction request,
  record the corresponding monetary amount of the authenticated cash bills to be stored in or dispensed from the cash storage receptacle, based on the respective cash deposit request or the respective cash withdrawal request,
  cause to dispense, through the cash bills dispensing component, to the respective customer, the authenticated cash bills, based on the respective cash withdrawal request; and
a communication component, having a network connection with the computer network and configured to transmit the respective electronic cash transaction request, through the computer network, from the POS terminal device of the cash-only retail location to the electronic account management computer associated with the respective financial entity.

In some embodiments, the present disclosure also provides exemplary technically improved computer-based systems, computer-implemented methods, and computer-readable media, including media implemented with and/or involving one or more software applications, whether resident on computer devices or platforms, provided for download via a server and/or executed in connection with at least one network, that include or involves features, functionality, computing components and/or steps consistent with those set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

As set forth in more detail, below, POS terminal devices, systems and methods designed to provide and/or process cash transactions for customers of cash-only retail locations without need for traditional ATMs are disclosed. In one embodiment, an exemplary POS terminal device may comprise a housing, dimensioned to install at a cash-only retail location, the housing having a cash storage receptacle and a cash management component configured to handle electronic cash transaction requests, and a communication component configured to transmit the respective electronic cash transaction requests. Further, the cash management component may include a reader component for interacting with a transaction card and/or device of a customer, an authentication component configured to scan and authenticate cash bills, a cash bills intake component, and a cash bills dispensing component. Accordingly, cash-only retail locations may implement such specialized POS terminal devices and process transactions in ways avoiding reliance on traditional ATMs, such as those leased from third parties.

Figure 1:
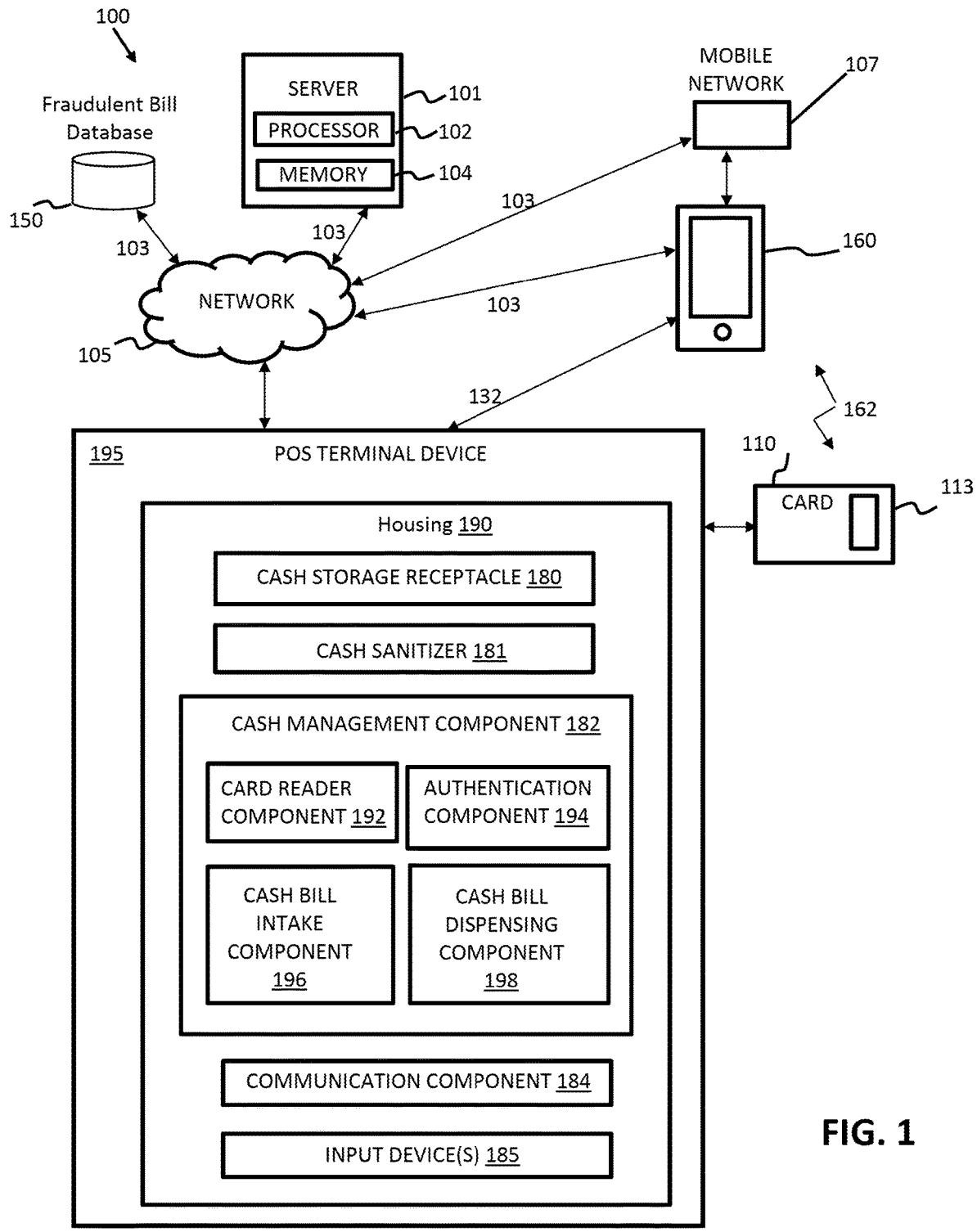
FIG. 1 is a block diagram of an exemplary system illustrating a POS terminal device and associated aspects of cash management, handling and/or processing, consistent with exemplary aspects of certain embodiments of the present disclosure.

FIG. 1 is a block diagram of an exemplary system illustrating a POS terminal device 195 and associated aspects of cash management, handling and/or processing, consistent with exemplary aspects of certain embodiments of the present disclosure. System 100 may include components such as a POS terminal device 195, a server 101, a transaction card 110, a mobile device 160, and a mobile network or component 107, which may all communicate 103 over a communication network 105. In some embodiments, the POS terminal device 195 is a specialized cash-centered or cash-based transaction device configured for use in cash-only retail locations, as explained in more detail, below. When a customer of such retail location attempts a transaction with the POS terminal device 195, e.g., with a transaction card 110, the retail business or merchant associated with the POS terminal device 195 must typically communicate with the financial entities and servers associated with a respective transaction card 110, e.g., in order to process and approve cash-related requests. In some embodiments, such financial entities may be a credit card company that has issued the transaction card to the user, a financial service entity that provides banking accounts associated with the card to the user, and the like, Some embodiments herein may also leverage the fact that the user of the transaction card may most likely carry or is near their mobile device, e.g., smartphone, and may utilize functionality involving the user's mobile device and the transaction card, including interaction between the two, as a part of various processes such as approving a transaction, additional authorization, and/or other processing associated with the cash-based transaction processing described herein.

According to embodiments herein, server 101 may be one or more computers and/or computer systems associated with entities that are stakeholders involved with the POS terminal device 195 transaction herein, such as the business or merchant, one or more financial services providers, such as an issuer of a credit card, debit card, or other transaction card associated with such POS terminal device transactions. In some embodiments, transaction card 110 may include various circuitry and/or components 113, such as those associated with known transaction card features and functionality and/or circuitry capable of communicating various card-related and/or cash-transaction-related information between the transaction card 110 to the POS terminal device 195.

In the illustrative embodiment shown in FIG. 1, an illustrative POS terminal device 195 may comprise a housing 190 dimensioned to install at a cash-only retail location. According to embodiments herein, the housing may comprise at least one cash storage receptacle 180, at least one cash sanitizer 181, at least one cash management component 182, and at least one communication component 184. In some embodiments, the cash management component 182 may comprise at least one card reader component 192, at least one authentication component 194, at least one cash bills intake component, 196, and at least one cash bills dispensing component 198. In some embodiments, the housing may further comprise one or more input device 185.

The cash storage receptacle 180 may be configured to store cash bills received at or handled by the cash-only retail location. The cash reader component 192 may be configured to interact with a transaction card or a transacting device presented by a customer of the cash-only retail location. Such interaction at the POS terminal device 195 may be configured to allow the customer to submit or withdraw the cash bills from a customer account associated with the customer at a respective financial entity. In various embodiments, the at least one reader component 192 may be configured to read one or more of a contact transaction card, a contactless transaction card, a wireless payment transaction card, a smartphone, and/or other mobile transacting devices. Here, for example, the at least one reader component 192 may include one or more of a magnetic stripe reader, a chip reader, a near field communication (NFC) component, and/or one or more other wireless communication components.

According to embodiments herein, the authentication component 194 may be configured to scan and authenticate cash bills, e.g., to ensure that the cash storage receptacle 180 accepts and/or contains only bills that have been authenticated. In some embodiments, the authentication component 194 may further comprise an imaging device configured to capture records of the cash bills submitted into, stored in, and/or dispensed from the cash storage receptacle 180. For example, the imaging device may be configured to scan the cash bills to be stored in or dispensed from the housing to perform one or more checks related to verifying authenticity, and/or determining counterfeit status, and/or create an inventory thereof.

According to other embodiments, the imaging device may also be configured to scan a check presented by the user for deposit or used in a transaction with the POS terminal device 195. In some embodiments, here, e.g. where a check is presented by the user for deposit or user in a transaction with the POS terminal device 195, the cash management component 182 may be configured to debit, in response to the user request for a check deposit, an account associated with the user for at least some of an amount of the check presented by the user for deposit. Further, the POS terminal device 195 and/or cash management component 182 may be configured to issue, in response to the user request for the check deposit, cash to the user in an amount no greater than the amount of the check deposit.

According to embodiments herein, the cash bill intake component 196 may be configured to accept the cash bills, and the cash bill dispensing component 198 may be configured to dispense the authenticated cash bills. Of course, in some embodiments, the intake component 196 and the dispensing component 198 are the same component, and may be integrated with or proximate a cash sanitizer 181. In some embodiments, the cash bill intake component 196 may be coupled to the cash sanitizer 181 such that all the cash bills fed through the intake component 196 are in turn sanitized by the cash sanitizer 181 before being retained in the cash storage receptacle 180. Similarly, the cash sanitizer 181 may be coupled to the cash bill dispensing component 198 such that, prior to being dispensed out of the cash storage receptacle 180, the cash bills are sanitized by the cash sanitizer 181. In other embodiments, a cash sanitizer may be configured as a stand-alone device for customers to disinfect the cash bills they are inserted into and/or withdraw from the POS terminal device 195, or from other cash reservoirs, such as a traditional cash register synchronized with the POS terminal device 195.

In some embodiments, communication component 184 may comprise one or more electronic components adapted to provide wired or wireless communication, e.g., via network 105, and configured to process respective electronic cash transaction requests. Such cash transaction requests may be transmitted, via the network 105, from the POS terminal device 195 of the cash-only retail location to the electronic account management computer associated with the respective financial entity, such as to server 101. In some embodiments, the communication component 184 may comprise at least one mobile device transceiver component configured to communicate 132 with a mobile device 160 presented, e.g. during execution of a subject transaction, such that the mobile device transceiver component interacts with the mobile device 160, such as via a near field communication (NFC) protocol.

In some embodiments, the input device(s) 185 may be configured to receive various input(s) from a customer at a retail location in order to process a cash-related transaction being requested. For example, the input device 185 may include a keypad (e.g., having number keys, function keys, alphanumeric keys, etc.) for the customer to enter information, such as a PIN, associated with the transaction card, and/or a scanner and/or touch pad for the customer to enter biometric information (e.g., fingerprint, face scan, eye scan, or any other biometric information) associated with their transaction card 110 or account and/or approval or authentication of transactions. In other examples, the input device 185 may comprise any suitable wireless technology that allows the customer to enter the credential (e.g., PIN, fingerprint, etc.) at a separate device. For example, the customer may enter the PIN at the mobile device 160, which in turn transmits the received PIN information to the POS terminal device 195.

With regard to the disclosed innovations, the cash management component 182 may be configured to execute instructions associated with performing methods such as that described below in more detail in connection with FIGS. 3A through 4B. In certain embodiments, for example, the cash management component 182 may be involved with processing such as: receiving a cash withdrawal request or a cash deposit request from the respective customer of the plurality of customers of the cash-only retail location; generating a respective electronic cash transaction request based on the cash withdrawal request or the cash deposit request; transmitting the respective electronic cash transaction request, through a computer network, from the POS terminal device to an electronic account management computer associated with the respective financial entity; receiving a respective cash transaction approval from the electronic account management computer associated with the respective financial entity based on the respective electronic cash transaction request; recording the authenticated cash bills to be stored in the cash storage receptacle 180, based on the respective cash deposit request; and causing to dispense, through the cash bills dispensing component 198, to the respective customer, the authenticated cash bills, based on the respective cash withdrawal request.

According to various embodiments, the cash management component 182 may also be configured for executing direct debit transactions. In some embodiments, such direct debit transactions may be performed without involving any intervening credit card processing components or requirements. For example, the POS terminal device 195 may be configured to issue cash to the user for a cash withdrawal request without the user performing any other transaction with the POS terminal device or at the cash-only retail location. In other embodiments, the cash management component 182 may be configured to track revenue information associated with cash transactions made at the cash-only retail location, i.e., for an owner of the cash-only retail location.

According to various embodiments, the cash management component 182 may be configured to receive an ATM or direct debit transaction request from a customer upon execution of a transaction (such as a card-based transaction, a mobile-device-based transaction, or the like) made by a customer at the card reader component 192. In one example, in connection with information gathered responsive to an authorized withdrawal request, the authentication component 194 may be configured to approve withdrawal of cash from the cash storage receptacle 180 and subsequently issue bills to the customer via the cash bill dispensing component 198. In some embodiments, upon such verification (e.g., scanning of the bills), the amount of withdrawal may be credited to the cash-only retail location from the financial institution and the dispensed cash may be credited to the customer as a withdrawal from the financial institution in various ways. Further, in some embodiments, once the customer is in receipt of the requested cash, the customer may be asked to verify the success of the direct debt transaction with their financial institution. In some implementations, the verification of the successful direct debt transaction may be performed at the POS terminal device 195, using the mobile device 160, or any other suitable communication channel enabling confirmation of the transaction. Here, once the financial institution receives the verification of a properly transacted debt request from the customer, the financial institution may issue a credit in the amount of the requested debt transaction to the merchant's account. For example, the financial institution may issue the credit via automated clearing house (ACH) to electronically process the credit payment to the merchant's account.

In further embodiments, the cash management component 182 may also be configured to receive a deposit transaction request from a customer upon the card reader component 192 reading a transaction card of the customer. In this case, responsive to the retrieved information from the transaction card and other information received from the customer such as the amount of fund to be deposited, the authentication component 194 may be configured to scan the cash bills deposited by the customer, and subsequently store the cash bills in the deposited amount into the cash storage receptacle 180. Similarly, upon being scanned, the cash bills from the customer become the fund belonging to the financial institution that is associated with the transaction card of the customer. Once the cash bills are scanned and verified, the cash management component 182 may be configured to transfer the fund in the deposited amount from the merchant's account to the customer's account to complete the deposit transaction. Once the transfer of the deposited amount of fund is successfully processed, the financial institution verifies the completion of the deposit transaction. In implementations, the verification of the successful deposit transaction may also be transmitted to the POS terminal device 195, to the mobile device 160 associated with the customer, or any other suitable ways to confirm completion of the requested transaction.

According to various embodiments, the cash management component 182 may be configured to scan the cash bills being stored in or dispensed from the housing to perform one or more checks related to verifying authenticity and/or determining counterfeit status thereof. In other embodiments, one or more of the imaging devices associated with the authentication component 194, the cash management component 182, and/or another component of the POS terminal device itself, may be configured to scan the cash bills being stored in or dispensed from the cash storage receptacle 180 to perform one or more checks related to verifying authenticity and/or determining counterfeit status thereof.

According to embodiments here, the disclosed POS terminal devices, systems, methods, and computer-readable media include or involve cash-based transactions involving POS terminal device 195 are configured to perform various novel and automated functionality, as set forth herein.

Unlike existing solutions, such as those based on use of nearby ATM devices, the present implementations utilize a highly-specialized POS terminal device 195 that may, e.g. via operations of the cash management and other component(s) thereof, be configured to perform the various cash-based transactions and/or processing herein, i.e., specific to cash-only retail locations. In these and other ways, implementations involving the present POS terminal devices 195 and associated features and functionality represent improvements over existing systems dependent on ATM transactions.

The disclosed implementations also yield cash transactions via POS terminal devices that improve utilization of both processing and communication resources. Here, for example, the present embodiments may provide ATM-like transactions and benefits, without installation of and burdens associated with a conventional physical ATM at, in, or near the cash-only retail site. This obviates added costs, processing steps, and physical inconveniences otherwise required for operating and maintaining conventional ATMs, e.g., as prior systems typically require authorization from a financial institution to install, maintain and secure an ATM, and include charges to authorize each ATM transaction. Benefits of the present technology are achieved by embodiments that operate the disclosed POS terminal devices and provide the innovative cash-based transactions associated therewith. Moreover, improved POS terminal devices having the disclosed cash-handling and/or cash-processing features and functionality improve responsiveness, efficiency, autonomousness, and security-related capabilities of cash transactions provided by merchant-based devices. Implementations herein also reduce likelihood of customer exposure to fraud involving ATMs (e.g., skimmers, etc.), while also decreasing the receipt, handling and dissemination of counterfeit bills, thereby offering technical improvements over the use of conventional ATMs and reducing or eliminating problems associated therewith.

The disclosed implementations further improves utilization of cash-handling resources in a manner that addresses the public health concerns, such as a viruses or other illnesses that may be carried by bills. As the cash bills are processed into or out of a cash storage receptacle, using the technology disclosed herein, the transactions conducted avoid unnecessary contact with potentially-contaminated cash and/or also facilitate the sterilization of cash before it travels into the hands of others.

The disclosed implementations for cash storage free ATM transactions further improves the security concerns in cash transaction. For example, given the authentication component's ability to scan and verify cash bills together with a knowledge reservoir logging the serial numbers associated with the cash bills (i.e., especially those flagged as fraudulent), the improved POS terminal device may be configured to recognize counterfeit cash bills and thereby reject such bills. With the unique capability of being fraud-preventing, the improved POS terminal device provides a technical solution of defense mechanisms against cash-related wrongdoing, frauds, and/or crimes.

Turning back to FIG. 1, server 101 may include at least one processor 102 and a memory 104, such as random-access memory (RAM). In some embodiments, server 101 may be operated by the financial institution issuing the transaction card, by the merchant, and/or by any transaction clearing house used for authorizing the credit card for use.

Transaction card 110 may be formed from plastic, metal, or any other suitable material. Transaction card 110 may include card circuitry and/or components 113 formed directly therein, and/or disposed therein by gluing, bonding or by any suitable adhesion method for affixing circuitry to the material of transaction card 110. Card circuitry may be configured to utilize any hardwired circuitry. Card circuitry may be implemented as one or more integrated circuit chips, and/or electronic devices, electrically interconnected and bonded to one or more circuit boards, for example.

Mobile device 160, such as a smartphone or other portable or wearable electronic device, may include mobile device circuitry. Mobile device circuitry may include a mobile device processor, a memory, such as RAM, communication circuitry and interface, and any input and/or output device, such as a touchscreen display. RAM may store code that, when executed by processor, may cause processor to implement aspects of one or more transaction authentication schemes herein, including those involving pairing with transaction card 110 to verify whether the transaction is valid and/or whether the user of the transaction card 110 is an authorized card user. In some embodiments, a transaction card application running on mobile device 160, such as an application supplied by the financial institution issuing the transaction card 110 and/or managing the transactions of the transaction card user, may include various modules that may transmit information to the POS terminal device, relay information back to the financial institution (e.g., server 101), and communicate with other computing components.

Various embodiments herein also solve technical problems associated with verifying that cash being distributed to a person in possession of a transaction card 110 is being provided to an authorized user of the transaction card. Here, for example, various features and functionality disclosed herein may be utilized in connection with such POS terminal device processes that involve pairing of transaction card 110 with mobile device 160, such as in the form of second-factor or multi-factor authentication (2FA or MFA) schemes, e.g., to validate that a transaction is being performed by an authorized card user. In other embodiments, various information related to the successful pairing of the transaction card and the mobile device may be relayed back to or through the server 101 so as to approve transactions, such as providing cash, purchasing goods and/or services, and the like, initiated with the transaction card 110.

In some embodiments, an initial authentication for pairing the transaction card with the mobile device may be implemented by the user contacting the financial institution from the user's mobile device to initially authorize the pairing of transaction card 110 with mobile device 160, e.g., to receive pairing approval. In other embodiments, the pairing and/or unpair processes between the transaction card and the mobile device may occur automatically and seamlessly such as without any action on the part of the user, particularly if the same mobile device had been previously paired with the same transaction card in the past. In yet other embodiments, proximity MFA may use biometrics (e.g., fingerprint, voice recognition, etc.) and/or a password entered by the user and/or a swiping of the mobile device screen by a finger of the user and/or the proximity of the transaction card to the mobile device or any client device, for example, to pair or unpair the transaction card with the client.

In some embodiments, if the transaction card is determined to be in possession by an unauthorized individual via implementations herein, e.g. at/via POS terminal device 195, an entity associated with the transaction, such as the merchant deploying the merchant terminal 195, may generate or receive an alarm or alert that the card user is potentially unauthorized (e.g., an alert on a display of merchant terminal 195) or that additional authentication should be performed to verify that the subject transaction is not fraudulent.

With regard to the disclosed innovations, the POS terminal device 195 or housing 190 may further comprise at least one cash bill sanitizer 181. The cash bill sanitizer 181 may be configured to sterilize or sanitize cash bills that are transacted at the POS terminal device 195. In some embodiments, the cash bill sanitizer 181 may be a build-in component of the POS terminal device 195. In some other embodiments, the cash bill sanitizer 181 may be implemented as a stand-alone device that sterilize the cash bills that are put therethrough. The cash bill sanitizer 181 may include any suitable mechanism to sanitize cash bills. For example, it may include UV (ultraviolet) irradiation, UV roller(s), a dry laminate roller, and the like. In some embodiments, the authentication component 914 may be configured to incorporate the function of the cash bill sanitizer 181 such that, in connection with scanning the bills for security concerns, they are also sanitized at the same time. In some other embodiments, the cash bill sanitizer 181 may be configured at a component other than the authentication component 194, for example, as part of the cash bill receptacle 180. The cash bill sanitizer 181 may be configured to ensure that any bills received into the cash bill receptacle 180, as well as any bills dispensed out of the cash bill dispenser, are at least sanitized once during handling/processing thereby. Additional details of such cash bill sanitizer 181 embodiments are set forth in connection with FIGS. 2C and 2G, below.

With regard to the disclosed innovations, the system 100 may further comprise a fraudulent bill database 150. The fraudulent bill database 150 may be configured to store the serial numbers of the fraudulent bills (e.g., stolen bills, counterfeiting bill numbers, bills advanced on fraudulent transactions, such as bounced checks, etc.) that are available for access over a network and/or locally within a geographic region or neighborhood. For example, as the authentication component 194 scans cash bills for authentication, it may further record the serial numbers of the cash bills being processed via the POS terminal device 195. In one embodiment, the serial numbers of the cash bills dispensed and the cash bills deposited are recorded in data storage, such as an inventory of the merchant of the cash-only retail location. Here, then, if the merchant location is robbed, the serial numbers associated with the stolen bills may be transmitted to the fraudulent bill database 150. In some embodiments, the fraudulent bill database 150 may only be accessible in a local geo-area (e.g., within the merchant community of a neighborhood, region, or the like) so that a device of another retailer, which is configured to scan cash bills, may be configured access data stored in the fraudulent bills database 150 and recognize the serials numbers that are alerted to be counterfeit or fraudulently in commerce. In some other embodiments, fraudulent bill database 150 is accessible over a network 105, such as the Internet, etc., so that a remote merchant device or POS terminal device of another retailer participating in such fraudulent bill monitoring may also be configured to scan cash bills for recognition against the serial numbers flagged in the fraudulent bill database 150. In one embodiment, blockchain technologies may further be applied to secure, via immutable records, the anti-fraud cash bill monitoring mechanism(s) provided by the POS terminal device 195 and/or network communication capabilities.

With regard to specific embodiments and implementations of the disclosed technology, the POS terminal device 195 may be constructed in a variety of shapes and configurations, and may have various different form factors. POS terminal devices 195 herein may, for example, comprise a POS (point-of-service, point-of-sale, etc.) device, a countertop device (e.g., one taking the place of or implemented in connections with a cash register, etc.), a wall-mounted devise, a freestanding device, and the like. According to several illustrative embodiments, for example, FIGS. 2A-2B are diagrams of two exemplary POS terminal devices, consistent with exemplary aspects of certain embodiments of the present disclosure.

Figure 2A:
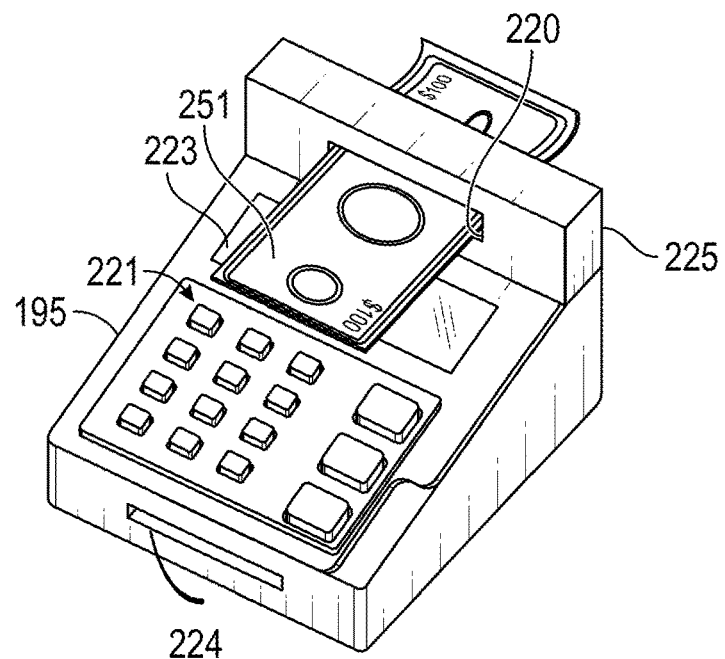
FIGS. 2A-2B are diagrams of exemplary POS terminal devices, consistent with exemplary aspects of certain embodiments of the present disclosure.
Figure 2B:
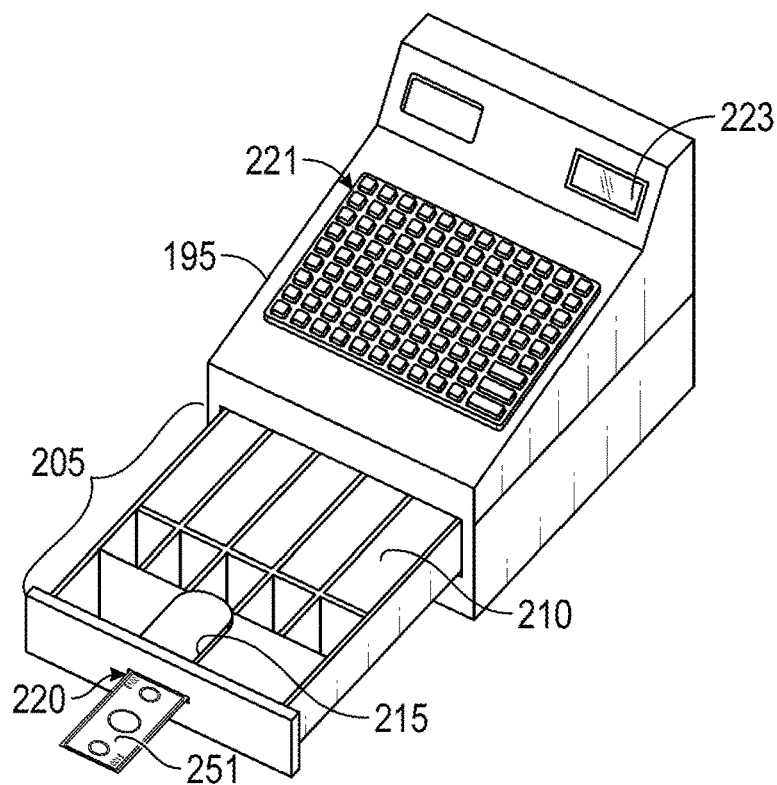

FIG. 2A is a perspective diagram illustrating one exemplary POS terminal device 195, consistent with exemplary aspects of certain embodiments of the present disclosure. As shown in FIG. 2A, the POS terminal device 195 may include a housing with a cash bill handling module 225 attached or associated therewith. Here, for example, the cash bill handling module 225 may include or involve the features and functionality of one or more of the cash bill intake component 196, the cash sanitizer 181, the cash bill dispensing components 198, and other components set forth above or elsewhere herein. In some embodiments, instead of being an integral part of the housing, the cash bill handling module 225 may be electrically coupled or attached to the POS housing, or otherwise associated with the POS housing in any suitable manner. Referring to the example embodiment shown in FIG. 2A, the cash bill handling module 225 may be configured to receive a cash bill 251 at an input port 220, i.e., on a receiving side, for processing, and dispense the cash bill 251 via an associated exit port. In embodiments where the cash bill handling module 225 includes a cash sanitizer 181, cash bills 251 being processing via the cash bill handling module 225 will be disinfected (e.g., treated, sterilized, irradiated, etc.) while being otherwise scanned and processed. Further details of such cash bill sanitization are described in connection to FIGS. 2C-2G, below.

According to embodiments of the present disclosure, the device illustrated in FIG. 2A may be dimensioned to install as a POS card-processing or other card-transacting device at a cash-only retail location. Referring to the embodiment shown in FIG. 2A, in addition to the cash bill handling module 225, such POS terminal device 195 may further include a keypad 221, a display 223, and a slot to receive a transaction card 224. Additional details of cash bill handling components and functionality are described in connection to FIGS. 2D-2E, below. According to embodiments herein (not shown), the overall POS terminal may also include, inter alia, at least one cash storage receptacle, at least one cash management component, and at least one communication component. In some embodiments, the cash management component may comprise one or more of: a card reader component, an authentication component, a cash bills intake component, a cash bills dispensing component, ad/or a check-intaking component, among other elements.

In use, e.g., when a customer performs a card-based transaction at the POS device 195, various information may be entered via the keypad 221, such as a PIN code for an ATM transaction. an amount of cash to be withdrawn, an amount of cash to be deposited, an amount of cash to be advanced for a check being deposited, and the like. Other information relating to transactions may also be provide at the keypad 221 to indicate information such as "yes" or "no" to various aspects of the transaction (e.g., printed receipts). In various embodiments, the transacted amount and transactional information may be displayed at the display 223 of the POS terminal device 195.

FIG. 2B is a perspective diagram illustrating another exemplary POS terminal device 195, consistent with one or more embodiments of the present disclosure. As shown in FIG. 2B, the POS terminal device 195 may also comprise structure that serves the role of a cash register or other cash repository, in addition to other features and functionality shown, including a housing, keypad 221, display 223, and the like. In some embodiments, the cash drawer 205 may be configured to slide into or otherwise be secured inside the housing of the POS terminal device 195. According to some embodiments, the drawer 205 may be compartmentalized into a plurality of bins 210 to store cash bills of different denominations. In other embodiments, the drawer 205 may also include a single bin to collect cash bills of all denominations, which may be sorted and/or dispensed via other techniques, including fully-automated techniques.

According to embodiments herein, a portion of the POS terminal device may further include a cash bill handling module 215, which may be similar to the cash bill handling module 225 described above in connection with FIG. 2A. As shown in FIG. 2B, the cash bill handling module 215 may be integrated into a cash drawer 205, or it may be integrated into other similar cash intake portion of the POS terminal device, or it may be positioned elsewhere, e.g., on or near the POS terminal device 195. As with the embodiment shown in FIG. 2A, the cash bill handling module 215 may also be configured with components for sanitizing and/or sterilizing the cash bills. Further, as in other embodiments, the cash bill handling module 215 may be configured to scan and process the cash bills 251, including recording the serial numbers for both the cash bills received into the POS terminal device 195 and the cash bills dispensed out of the POS terminal device 195. In various embodiments, the cash bill handling module 215 may be positioned between the cash bill intake/dispensing port 220 and the plurality of bins 210, though it may readily be located elsewhere, with the bills being otherwise handled to and from the relevant bill-storage receptacle(s). Additional details of the cash bill handling module 215 are described in connection to FIG. 2F, below, and elsewhere herein.

Also, in the illustrative example of FIG. 2B, the POS terminal device 195 may be configured to be coupled to and receive data from a Universal Product Code (UPC) scanner to obtain the pricing information on items purchased by the customer. Further, other information such as the price information or code associated with items purchased by the customer may be entered at the keypad 221 as well.

Figure 2C:
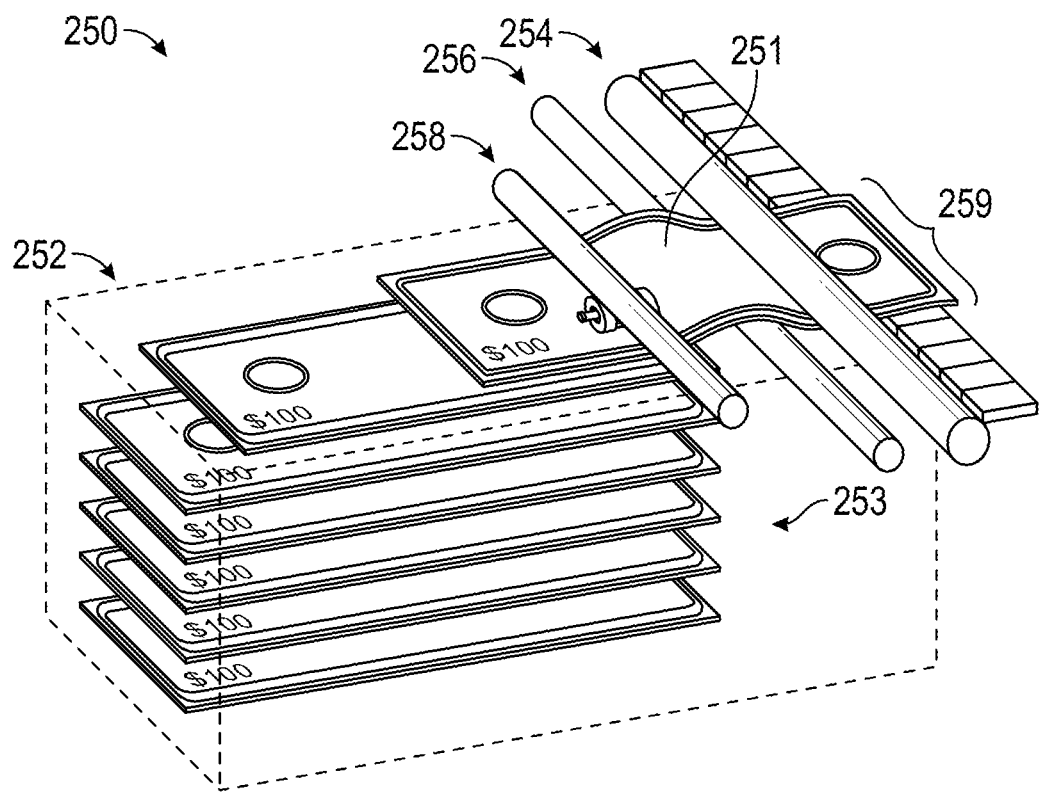
FIGS. 2C-2G are perspective diagrams of exemplary cash handling and/or management components, consistent with exemplary aspects of certain embodiments of the present disclosure.

FIG. 2C is a diagram illustrating exemplary cash handling and/or management components, such as a cash sanitizer 250, in accordance with one or more embodiments of the present disclosure. As shown in FIG. 2C, cash sanitizer 250 may include a set of rollers 254, 256, 258 configured between a cash intake port 259, and a bill retention area 252 (as indicated by the dotted line), which may be the same as or separate from the cash storage receptacle, as detailed below. According to the disclosed innovation, the cash sanitizer 250 may be configured to receive and sanitize incoming cash bills, and retain sanitized cash bills in the cash retention area 252. In some embodiments, the cash sanitizer 250 may be coupled to the cash bill intake component 196 for receiving cash bills transported therefrom. In other embodiments, cash sanitizer 250 may be integrated with the cash bill intake component 196 into one composite component. In some embodiments, the cash retention area 252 may be implemented as the cash storage receptacle 180. In other embodiments, the cash retention area 252 may be implemented as a component configured to hold the sanitized bills, which may then be transported to the cash storage receptacle 180.

As shown in FIG. 2C, the cash sanitizer 250 may be configured to receive a cash bill 251 at a first roller 254, and transport the cash bill 251 along a processing path 253 towards one or more second rollers 256, 258. According to embodiments herein, the cash bills being processed along the processing path 253 may be sanitized via, or in connection with, handling by the rollers 254, 256, 258. Once each cash bill 251 is processed along the path 253 via rollers 254, 256, 258, and, in some embodiments, sanitized, it may be retained in the cash retention area 252.

According to various embodiments, cash bill sanitizer 250 may further include one or more sanitizing sources for disinfecting the cash bills transported along the processing path 253. In some embodiments, the one or more sanitizing sources include one or more UV and/or other irradiation sources configured for optically sanitizing the cash bills during being transported along the processing path 253. In one embodiment, such one or more UV/irradiation sources includes one or more UV C light sources, which are configured for disinfecting the cash bills, such as by exposure for a designated period of time.

According to other embodiments, the one or more sanitizing sources may include one or more heat sources for thermally sanitizing the cash bills during being transported along the processing path 253. In some embodiments, the rollers 254, 256 and 258 may be configured as the thermal rollers for disinfecting the cash bills transported, e.g., via exposure to a specified temperature for a designated period of time.

According to other embodiments, the one or more sanitizing sources may include one or more chemical and/or reagent sources for sanitizing the cash bills during being transported along the processing path 253. In some embodiments, the rollers 254, 256 and 258 may be configured to deposit antimicrobial and/or antiviral compositions unto sides of the cash bill 251. In some embodiments, such compositions applied to cash bills may comprise one or more substantially dry chemical reagents, which leave no liquid or resident in or on the bills. Further, such compositions may be dispersed, pressed, coated, spread, or otherwise deposited onto the cash bill 251 during the transportation along the processing path 253. Accordingly, in connection with being processed via the cash sanitizer 250, cash bills may be irradiated and/or treated with various disinfection compositions and thereby sanitized. In various embodiments, such composition may include, for example, disinfectants (e.g., bleach, etc.), antiviral agents, antibacterial agents, antiseptics (solutions of rubbing alcohol), antibiotics, and any combination thereof.

In some embodiments, rollers 254, 256 and 258 may have circumferential surfaces of metal, glass, rubber, soft plastic, fabric, or the like.

According to various embodiments, the cash sanitizer 250 may further include a transport module (not shown). The transport module may be configured to control one or more of the rollers 254, 256, and 258. In one embodiment, the transport module may be configured to initialize movement of one or more of rollers 254, 256 and 258; pause movement of one or more of rollers 254, 256 and 258; and/or reverse direction of one or more of rollers 254, 256 and 258. By controlling the rotational direction of rollers 254, 256 and 258 and/or the speed of rotation, the transport module may control the orientation and/or processing speed of the cash bills along the processing path.

In some embodiments, the cash sanitizer 250 may be configured at the POS terminal device 195, for example as the cash sanitizer 181. In other embodiments, the cash sanitizer 250 may be configured as a unit that is separate or independent from POS terminal device 195, e.g., as a stand-alone device, a device attachable to POS terminal device 195, and/or a device attachable to or configurable with another cash dispensing device, such as an ATM, or the like. In some embodiments, cash sanitizer 250 may comprise a set of rollers that include more or less than the three rollers 254, 256, 258 shown in FIG. 2C.

Figure 2D:
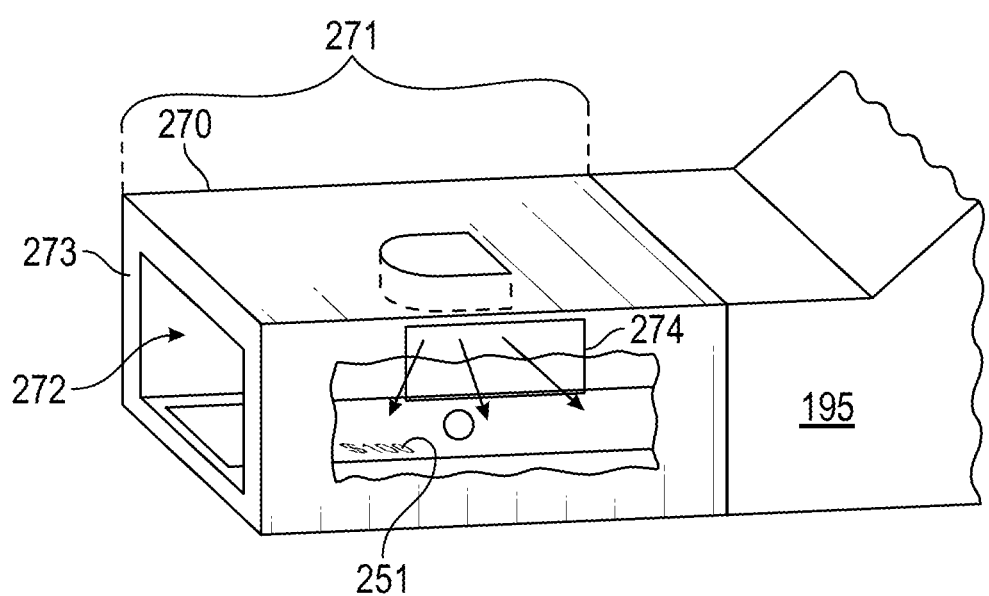

FIG. 2D is a diagram illustrating an exemplary open inspection module 271, consistent with exemplary aspects of certain embodiments of the present disclosure. Referring to FIG. 2D, a POS terminal device 195 may include or be configured with an open inspection module 271 comprised of a housing 270, a cash bill intake/dispensing component or port 272, and an authentication component 274. In some embodiments, the cash bill intake/dispensing port 272 may have an opening 273 in the housing 270 for depositing cash bills and/or dispensing and retrieving cash bills therefrom. The housing 270 is configured with the intake/dispensing port 272, the authentication component 274, and potentially other components (not shown). According to embodiments herein, the cash bill intake/dispensing port 272 may be configured as a cash bill intake (e.g., inlet) only or as cash bill dispenser (e.g., outlet) only, in which case the housing would generally include another complimentary cash inlet/outlet component. In some embodiments, the housing 270 may be configured to structurally interface with a POS terminal device 195. Further, the cash bill intake/dispensing component may be configured, such as via components within the open inspection module 271 and/or the POS terminal device 195, to perform operations consistent with the features and functionality set forth elsewhere, herein, such as those described in connection with FIGS. 3A through 4B.

In some embodiments, such as when cash bills are deposited via the cash bill intake/dispensing port 272, the open inspection module 271 is configured to perform operations including scanning the cash bills 251 for authentication, serial numbers, verification against a fraudulent bill database 150, sanitizing, etc. Further, the housing may also comprise rollers or other structure to transport the cash bills to additional processing steps and/or for storage in a cash storage receptacle 180. According to embodiments herein, the open inspection module 271 may also include a cash bill sanitizer as described above with connection to FIG. 2C, e.g., to sanitize the cash bills received via the intake port 272. In other embodiments, when a cash bill is rejected for reasons such as being deemed counterfeit, procured fraudulently or otherwise 'hot', and/or unverifiable due to unrecognizable serial numbers, water marks, etc., the open inspection module 271 may be configured to refuse or eject such cash bills back out of the opening 273 associated with the intake/dispensing port 272.

Figure 2E:
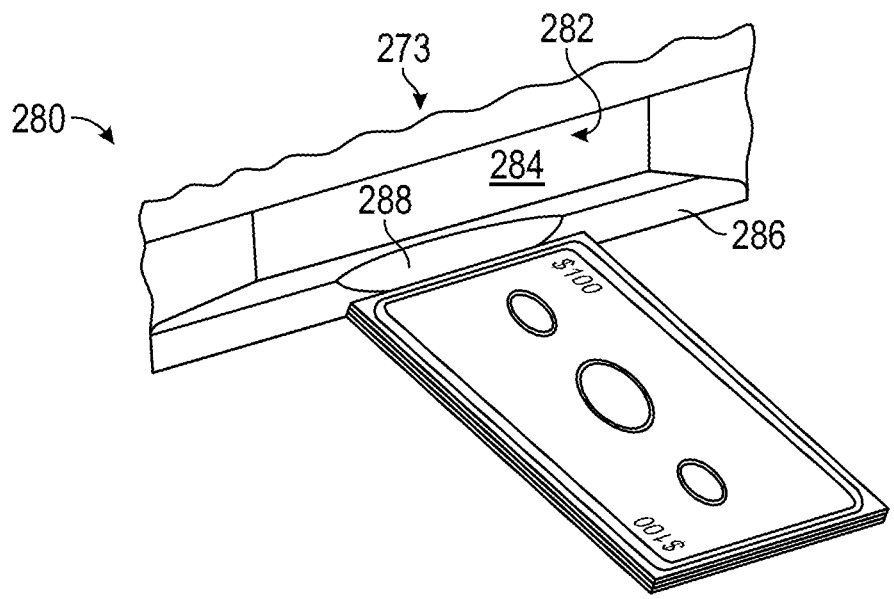

FIG. 2E is a perspective diagram illustrating a portion of one exemplary cash intake/dispensing component of the POS terminal device 195, in accordance with one or more embodiments of the present disclosure. The illustrative cash intake/dispensing component 280 shown in FIG. 2E is positioned at a surface 273 of the POS terminal device 195 (other interfaces and components of such POS terminal device 195 are not shown for simplicity). Further, the cash bill intake/dispensing component 280 may be configured with an opening 282 having a gate 284. In some embodiments, the gate 284 may be configured to block access through the opening 282 except at appropriate times during transactions with authorized users. Any suitable gating mechanism to block the opening 282 may be implemented for secure access thereto. As shown herein, the gate 284 (e.g., shutter gate, etc.) for the cash intake/dispensing component 280 is shown in a closed position. The gate 284 can be opened to allow cash bills to be dispensed to a customer through the opening 282.

In the embodiment shown, a money tray 286 is configured to have a cut-out zone (or area) 288 for a customer's finger(s). In general, the money tray 286 is configured to provide a space to hold and position bills being inserted into and provided from the opening 282. In the example shown in FIG. 2E, the money tray 286 is located below the gate 284. A finger or hand-shaped cut-out 288, such as a concave depression or cavity in the money tray 286, is spaced to receive a portion of a customer's hand while grasping dispensed cash bills, e.g., to facilitate removal.

Figure 2F:
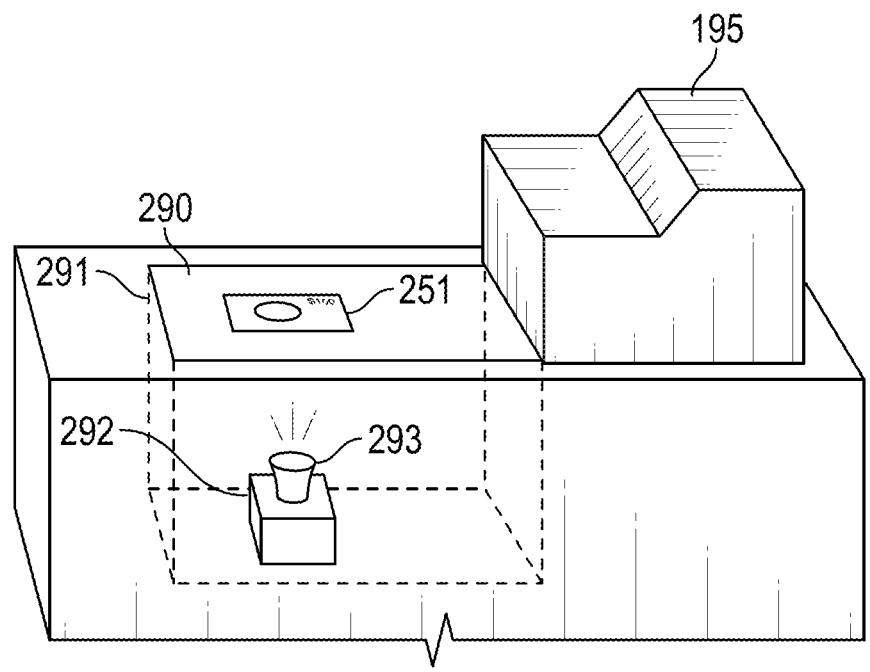

FIG. 2F is a perspective diagram illustrating an exemplary 'in counter' component 290, which may be part of or associated with a POS terminal device 195, in accordance with one or more embodiments of the present disclosure. As shown in the example of FIG. 2F, the POS terminal device 195 may be configured for placement on top of a structure, such as a sales counter of a retail location, and may include a housing 291 having a scanning surface 290 and an authentication component 292, which may include an imaging device 293. In this example, a cash bill 251 may be placed on top of the scanning surface 290 such that the imaging device 293 is configured to scan the cash bill(s) to obtain authentication information. The surface 290 may be implemented with various transparent materials through which the imaging device 292 can transmit to optically recognize and/or identify information regarding the cash bill. Such information may include, for example, the size, shape and/or denomination of such bill, the serial number, various characteristics used to determine such bills are not counterfeit bills, and the like. The surface 290 may comprise a glass surface, a transparent plastic surface, or the like. Once scanned, and authenticated in some embodiments, the cash bill(s) 251 presented at the in-counter component 290 may also then be sanitized, transported to the POS terminal device 195, and/or stored in the a cash storage receptacle 180, as described elsewhere herein.

Figure 2G:
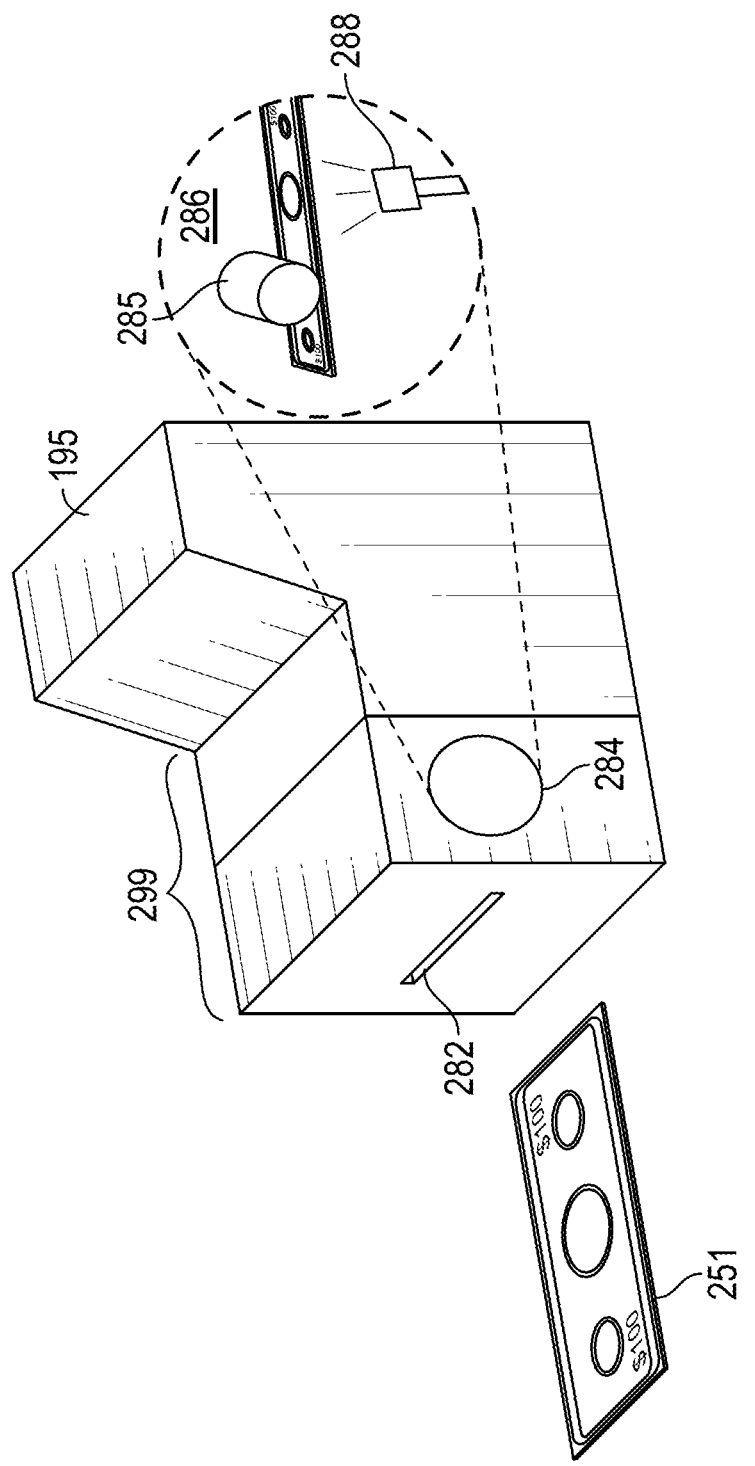

FIG. 2G is a perspective diagram illustrating a 'closed roller' component or module 299, which may be part of or associated with a POS terminal device 195, in accordance with one or more embodiments of the present disclosure. Referring to FIG. 2G, the POS terminal device may be configured to receive one or more cash bills 251, such as at an intake port 282. The POS terminal device 195 may further comprise various cash processing components at 284, such as an authentication component, a sanitizer, and the like, for handling the bills received through the intake component 282. As shown via exploded view 286 in FIG. 2G, such authentication components may include at least one roller 285, and at least one scanning and/or treatment device 288, such as one or more of an imaging device (such as an imaging device 293, as shown in FIG. 2F) and/or various sanitizing devices or sources (such as a cash sanitizer 181). Here, the roller(s) 285 may be configured to transport the cash bill 153 forward, while scanning and/or treatment device(s) 288 may be configured to one or more of: scan the cash bill for authentication, emit light onto the cash bill 251, and/or provide treatment(s) to the cash bills for sanitization. Here, embodiments that have a treatment or sanitization component may emit, for example, ultraviolet C light (e.g., light with wavelengths between 200-280 nanometers) onto the cash bill(s) 153 to sterilization and/or disinfection. In such implementations, the cash bill 153 is disposed via the roller 285 for treatment by an optical disinfecting source, i.e. at 288. In other embodiments, the roller and such optical source(s) may be configured in any manner relative to each other suitable for emitting lights onto the cash bill. In some embodiments, an optical source may be configured to scan and/or sanitize the cash bill(s) 153 during movement, such as during transfer to a cash storage receptacle 180. In other embodiments, roller(s) 285 may be configured to hold the cash bill(s) 153 once the bills are received inside the POS terminal device 195, for scanning and/or sterilization by the optical source(s), at 288. In some embodiments, the optical source(s) 288 may be configured to operate with a plurality of rollers, such as the set of rollers 254, 256 and 258 illustrated with FIG. 2C. Further, compositions such as antimicrobial compositions may be applied to the cash bill(s) via such rollers. In some embodiments, the roller(s) 285 may be configured as part of the cash bill intake component 282.

Figure 3A:
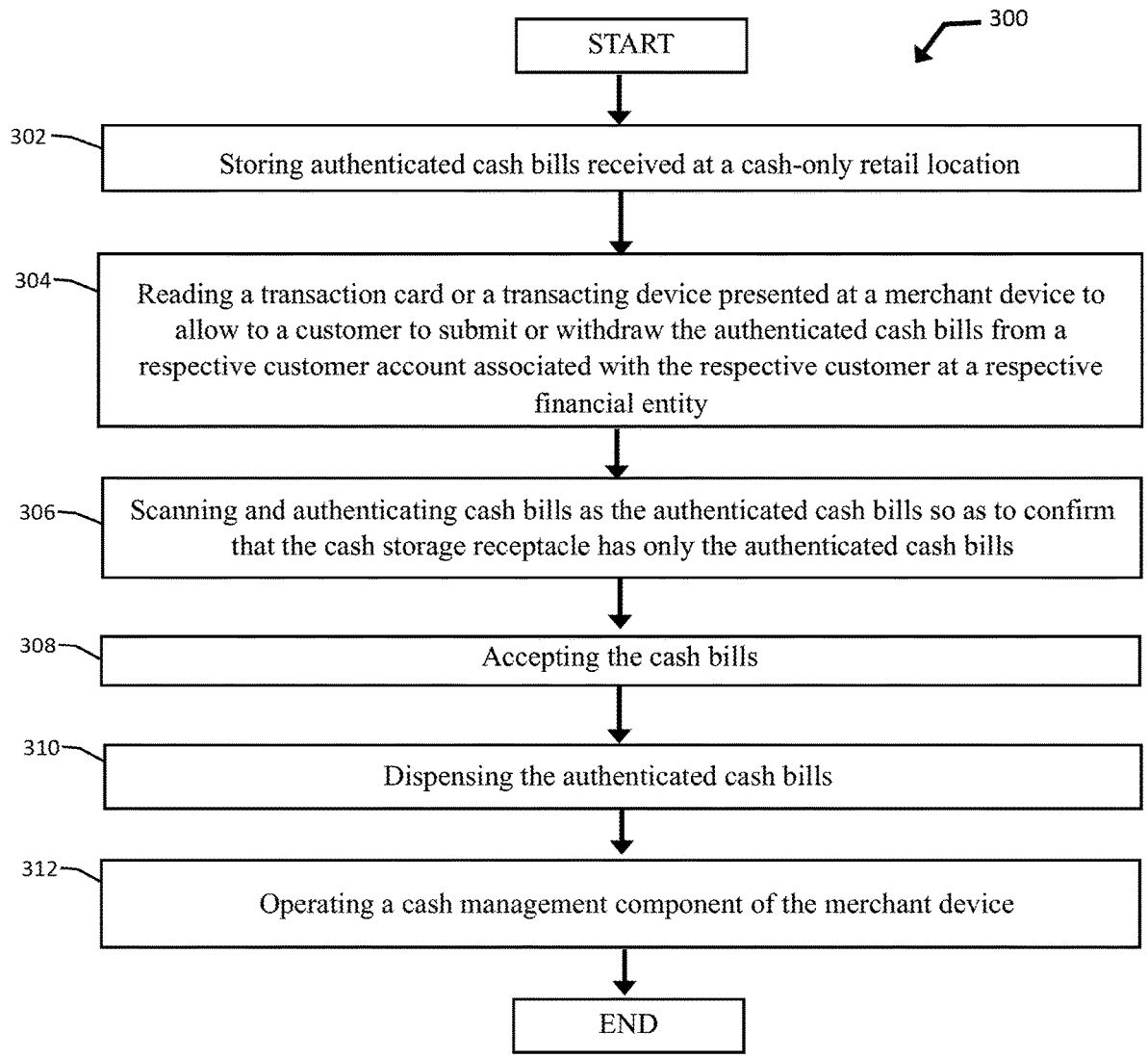
FIGS. 3A-3B are flowcharts illustrating an exemplary method related to management of cash-based transactions via a POS terminal device, consistent with certain embodiments of the present disclosure.

FIG. 3A is a flowchart illustrating one exemplary process 300 related to management of cash-based transactions via a POS terminal device, consistent with exemplary aspects of at least some embodiments of the present disclosure. As shown in the exemplary flowchart of FIG. 3A, an illustrative cash-based transaction process 300 may comprise storing authenticated cash bills received at the cash-only retail location, at 302, reading a transaction card or a transacting device presented at a POS terminal device to allow to a customer to submit or withdraw the authenticated cash bills from a respective customer account associated with the respective customer at a respective financial entity, at 304, scanning and authenticating cash bills as the authenticated cash bills so as to confirm that the cash storage receptacle has only the authenticated cash bills, at 306, accepting the cash bills, at 308, dispensing the authenticated cash bills, at 310, and operating a cash management component of the POS terminal device, at 312. Further, one or more aspects of such the cash-based transaction process 300 may be carried out via a network and/or online, e.g. via a portal or other network connection.

In some embodiments, the cash-based transaction process 300 may include, at 302, a step of storing authenticated cash bills received at the cash-only retail location. With regard to the disclosed innovations, in step 302, the bills may stored in a cash storage receptacle at the cash-only retail location, such of in a cash storage receptacle of a POS terminal device 195.

In some embodiments, the cash-based transaction process 300 may include, at 304, a step of reading a transaction card or a transacting device presented at the POS terminal device to allow to a customer to submit or withdraw the authenticated cash bills from a respective customer account associated with the respective customer at a respective financial entity. Further, according to various disclosed embodiments, step 304 may be performed by a reader component of the POS terminal device.

In some embodiments, the cash-based transaction process 300 may include, at 306, a step of scanning and authenticating cash bills as the authenticated cash bills so as to confirm that the cash storage receptacle has only the authenticated cash bills. With regard to the various aspects of the innovations, step 306 may be performed by an authentication component 194 of the POS terminal device.

In some embodiments, the cash-based transaction process 300 may include, at 308, a step of accepting the cash bills, e.g., those bills that have been authenticated. In some embodiments, step 308 may be performed immediately after the bills have been received by the cash bill intake component of the POS terminal device and authenticated.

In some embodiments, the cash-based transaction process 300 may include, at 310, a step of dispensing the authenticated cash bills. In various embodiments, step 310 may be performed by a cash bill dispensing component of the POS terminal device.

Figure 3B:
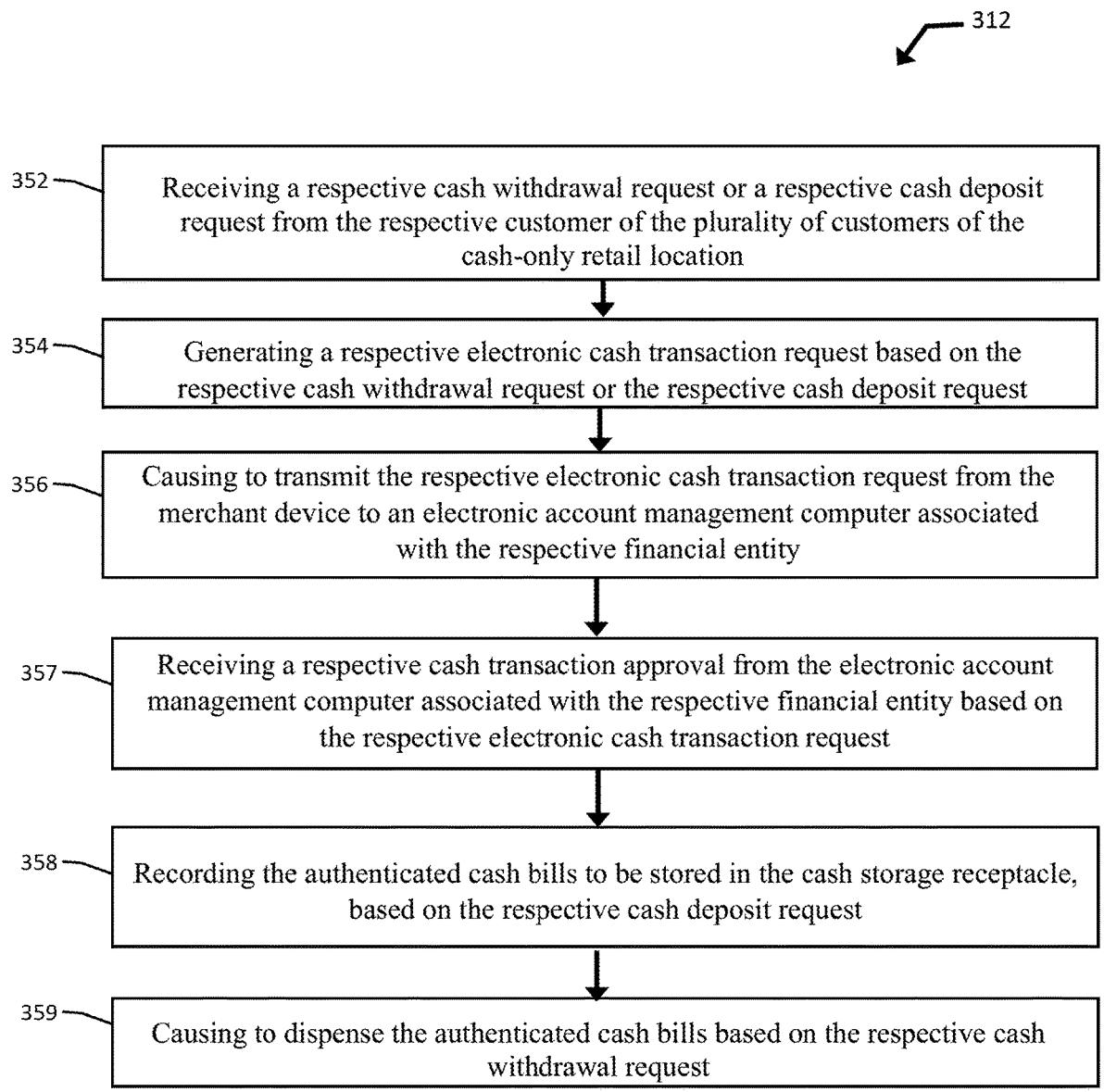

Further, the cash-based transaction process 300 may include, at 312, a step of operating a cash management component of the POS terminal device to perform various aspects of the cash-based transaction. With regard to such step, FIG. 3B is a flowchart illustrating one exemplary set of operating the cash management component according to step 312, consistent with exemplary aspects of at least some embodiments of the present disclosure. As shown in the exemplary flowchart of FIG. 3B, the cash management component of the POS terminal device may be operated to receive a respective cash withdrawal request or a respective cash deposit request from the respective customer of the plurality of customers of the cash-only retail location, at 352, generate a respective electronic cash transaction request based on the respective cash withdrawal request or the respective cash deposit request, at 354, cause to transmit the respective electronic cash transaction request from the POS terminal device to an electronic account management computer associated with the respective financial entity, at 356, receive a respective cash transaction approval from the electronic account management computer associated with the respective financial entity based on the respective electronic cash transaction request, at 357, record the authenticated cash bills to be stored in the cash storage receptacle, based on the respective cash deposit request, at 358, and cause to dispense the authenticated cash bills based on the respective cash withdrawal request, at 359.

With regard to step 356, various embodiments herein may be configured such that step 356 is performed by a communication component of the POS terminal device. In some implementations, step 356 may be performed by a communication component of the POS terminal device using or via a computer network.

With regard to step 359, various embodiments herein may be configured such that the authenticated cash bills are dispensed via a cash bill dispensing component. According to some embodiments, the authenticated cash bills may be dispensed to the respective customer.

According to some embodiments, methods herein may also comprise capturing records of the cash bills stored in and dispensed from the POS terminal device. Here, for example, the capturing may be performed by an imaging device of the POS terminal device. Such records may be stored locally in data storage and/or sent or stored remotely, via one or more networks or cloud storage components.

According to some embodiments, systems and methods herein may also include POS terminal devices configured to scan checks presented by customers for deposit or use in a transaction with the POS terminal device, including scanning by the same imaging device used to authenticate the cash bills.

According to some embodiments, systems and methods herein may also comprise debiting/crediting, in response to the user request for a check deposit, an account associated with the customer for at least some of an amount of the check presented by the user for deposit. In some embodiments, such debiting may be performed by the cash management component of the POS terminal device.

According to some embodiments, systems and methods herein may also comprise issuing, in response to the customer's request for the check deposit, cash to the user in an amount no greater than the amount of the check deposit. In some embodiments, issuance of cash may be performed by the cash management component of the POS terminal device.

Further, according to some embodiments, systems and methods herein may also comprise executing a direct debit transaction based on the cash withdrawal request, without involving any intervening credit card processing components or requirements. In some embodiments, such direct debit transaction may be executed by the cash management component of the POS terminal device.

According to some embodiments, systems and methods herein may also comprise issuing cash to the user for the cash withdrawal without the user performing any other transaction with the POS terminal device or at the cash-only retail location, such as a required purchase of a good or service. In some embodiments, such issuing may be performed by the POS terminal device.

According to some embodiments, systems and methods herein may also comprise scanning the cash bills being stored in or dispensed from the POS terminal device to perform one or more checks related to verifying authenticity or determining counterfeit status thereof. In some embodiments, such scanning may be performed by one or both of the imaging device, and/or the cash management component.

According to some embodiments, systems and methods herein may also comprise tracking revenue information associated with cash transactions made at the cash-only retail location. In some embodiments, such tracking may be performed by the cash management component of the POS terminal device.

According to some embodiments, systems and methods herein may also comprise reading one or more of a contact transaction card, a contactless transaction card, a wireless payment transaction card, a smartphone, and other mobile transacting devices, e.g., to initiate and/or otherwise perform one or more aspects of the disclosed technology. In some embodiments, such operation may be performed by the reader component of the POS terminal device.

Figure 4A:
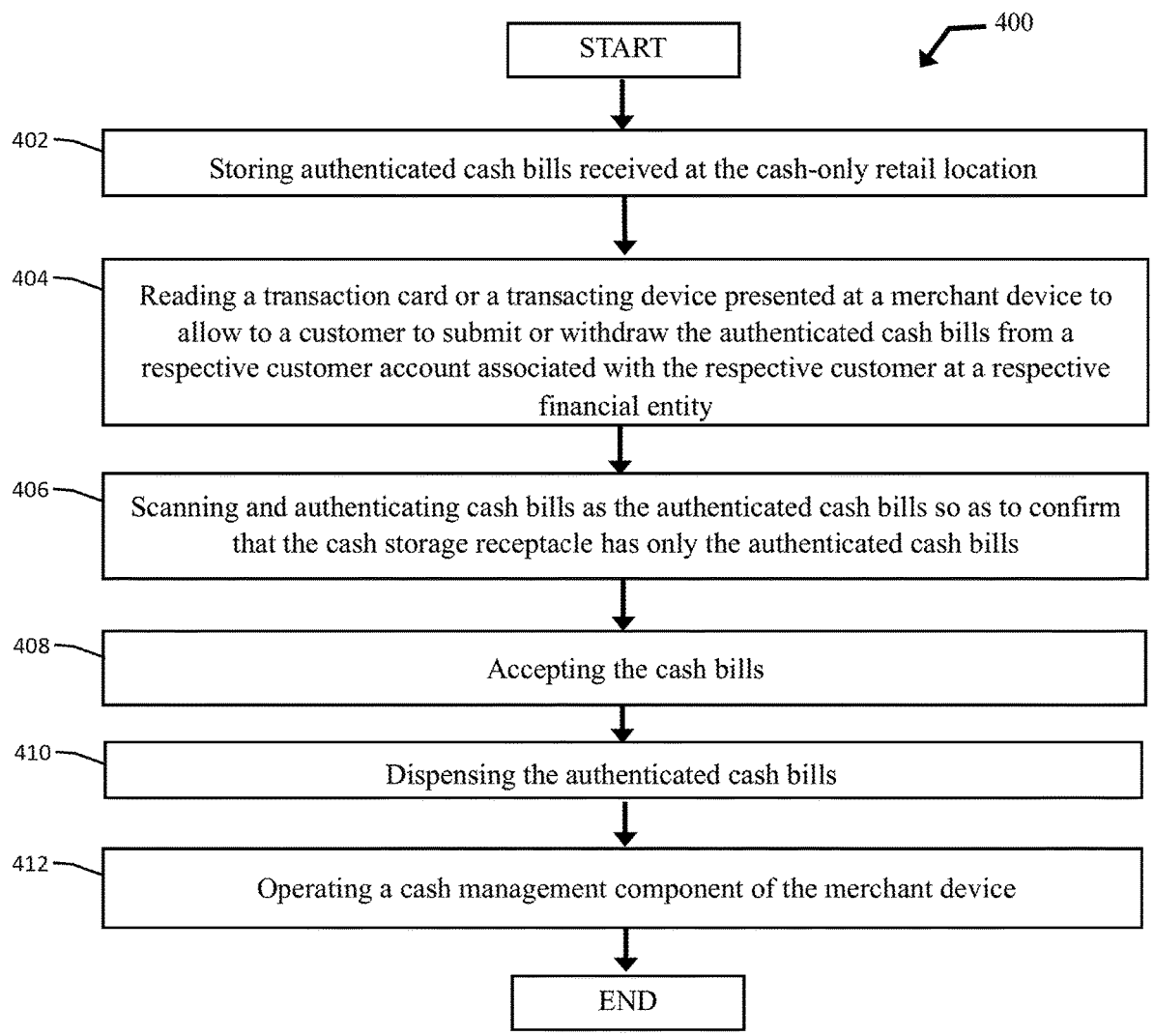
FIGS. 4A-4B are flowcharts illustrating another exemplary method related to management of cash-based transactions via a POS terminal device, consistent with certain embodiments of the present disclosure.

FIG. 4A is a flowchart illustrating another exemplary method related to management of cash-based transactions via a POS terminal device, consistent with exemplary aspects of at least some embodiments of the present disclosure. As shown in the exemplary flowchart of FIG. 4A, an illustrative process 400 may comprise storing authenticated cash bills received at the cash-only retail location, at 402, reading a transaction card or a transacting device presented at a POS terminal device to allow to a customer to submit or withdraw the authenticated cash bills from a respective customer account associated with the respective customer at a respective financial entity, at 404, scanning and authenticating cash bills as the authenticated cash bills so as to confirm that the cash storage receptacle has only the authenticated cash bills, at 406, accepting the cash bills, at 408, dispensing the authenticated cash bills, at 410, and operating a cash management component of the POS terminal device, at 412. Further, one or more aspects of the exemplary process 400 shown in FIGS. 4A-4B may be carried out in conjunction with processing performed over one or more networks, such as by network connection to one or more financial service providers (FSPs), via various transaction portals, online, and/or via other network connection.

In some embodiments, the cash-based transaction process 400 may include, at 402, a step of storing authenticated cash bills received at the cash-only retail location. With regard to the disclosed innovations, the cash bills may be stored in a cash storage receptacle of the POS terminal device at the cash-only retail location.

In some embodiments, the cash-based transaction process 400 may include, at 404, a step of reading a transaction card or a transacting device presented at the POS terminal device to allow to a customer to submit or withdraw the authenticated cash bills from a respective customer account associated with the respective customer at a respective financial entity. Further, according to various disclosed embodiments, step 404 may be performed by a reader component of the POS terminal device.

In some embodiments, the cash-based transaction process 400 may include, at 406, a step of scanning and authenticating cash bills as the authenticated cash bills so as to confirm that the cash storage receptacle has only the authenticated cash bills. With regard to the various aspects of the innovations, step 406 may be performed by an authentication component 194 of the POS terminal device 195.

In some embodiments, the cash-based transaction process 400 may include, at 408, a step of accepting the cash bills, e.g., those bills that have been authenticated. In some embodiments, step 308 may be performed immediately after the bills have been received by the cash bill intake component of the POS terminal device and authenticated.

In some embodiments, the cash-based transaction process 400 may include, at 410, a step of dispensing the authenticated cash bills. In various embodiments, step 410 may be performed by a cash bill dispensing component 198 of the POS terminal device 195.

Figure 4B:
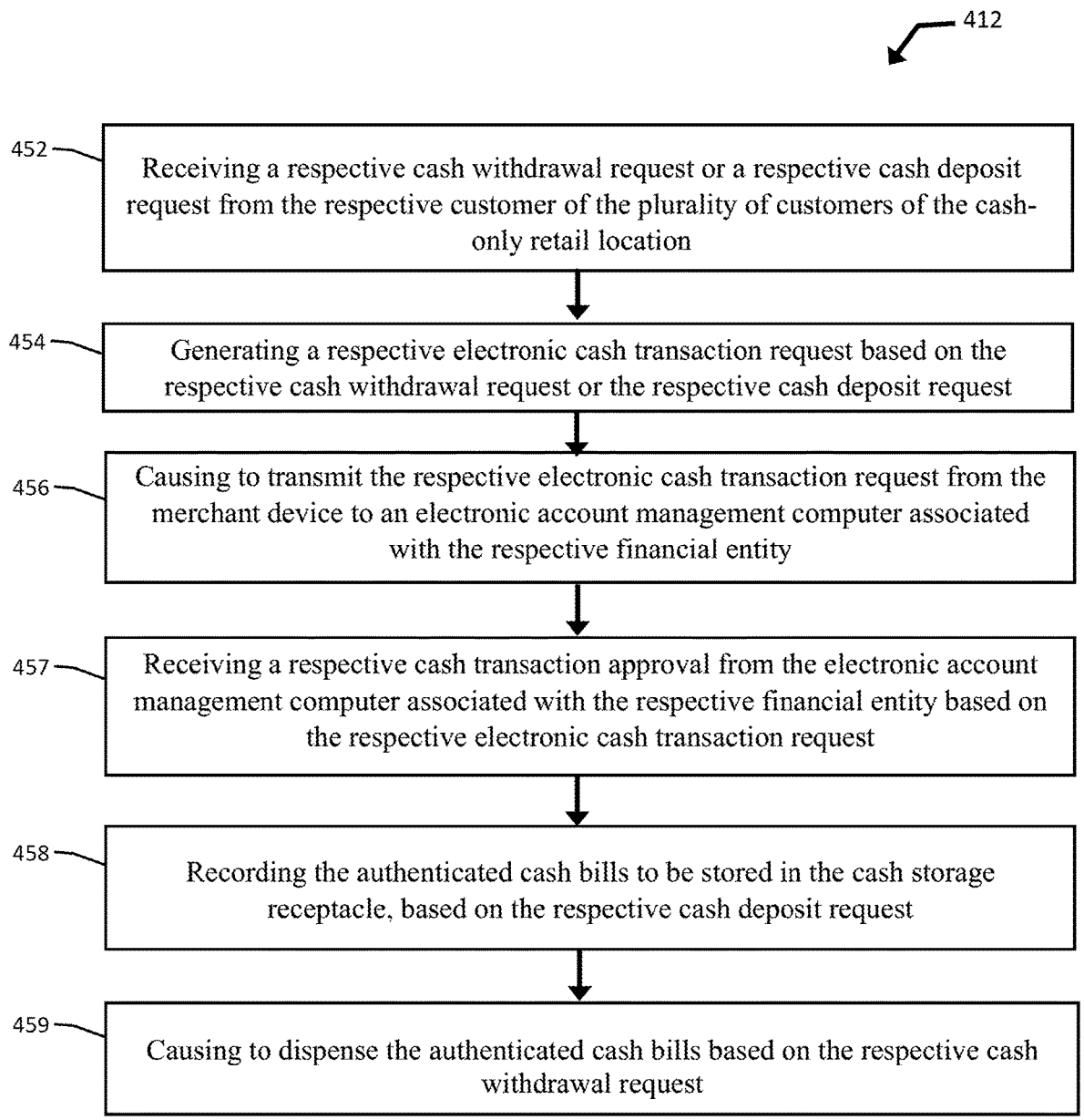

Further, the cash-based transaction process 400 may include, at 412, a step of operating a cash management component of the POS terminal device to perform various aspects of the cash-based transaction. With regard to such step, FIG. 4B is a flowchart illustrating one exemplary set of operating the cash management component according to step 412, consistent with exemplary aspects of at least some embodiments of the present disclosure. As shown in the illustrative embodiment of FIG. 4B, the cash management component of the POS terminal device may be operated to receive a respective cash withdrawal request or a respective cash deposit request from the respective customer of the plurality of customers of the cash-only retail location, at 452, generate a respective electronic cash transaction request based on the respective cash withdrawal request or the respective cash deposit request, at 454, cause to transmit the respective electronic cash transaction request from the POS terminal device to an electronic account management computer associated with the respective financial entity, at 456, receive a respective cash transaction approval from the electronic account management computer associated with the respective financial entity based on the respective electronic cash transaction request, at 457, record the authenticated cash bills to be stored in the cash storage receptacle, based on the respective cash deposit request, at 458, and cause to dispense the authenticated cash bills based on the respective cash withdrawal request, at 459.

With regard to step 456, various embodiments herein may be configured such that step 456 is performed by a communication component of the POS terminal device 195. In some implementations, step 456 may be performed by a communication component of the POS terminal device using a computer network.

With regard to step 459, various embodiments herein may be configured such that the bills are dispensed via the cash bill dispensing component 198. According to some embodiments, the authenticated cash bills may be dispensed to the respective customer.

Various other features and functionality, including those set forth above after the description of FIGS. 3A-3B, may be performed with or in association with the implementations set forth regarding FIGS. 4A-4B.

According to some embodiments, systems and methods herein may also comprise scanning the cash bills being stored in or dispensed from the POS terminal device to perform one or more checks related to verifying authenticity or determining counterfeit status thereof. In some embodiments, such scanning may be performed by one or both of: the imaging device; and/or the cash management component.

According to some embodiments, systems and methods herein may also comprise tracking revenue information associated with cash transactions made at the cash-only retail location. In some embodiments, such tracking may be performed by the cash management component of the POS terminal device.

With regard to such embodiments, it is noted that the disclosed POS terminal device and methods may include and/or involve a specialized POS terminal device configured to perform various automated functionality set forth herein. Unlike conventional devices, software and solutions, the present implementations may utilize an improved POS terminal device that may, via its various components, be configured to perform cash and/or check transactions without a merchant maintaining a physical ATM at a retail location. In these and other ways, implementations involving the POS terminal device empowered with the disclosed POS terminal device mechanism(s) represent improvements over conventional POS terminal devices such as a cash register, as well as a conventional ATMs.

The disclosed cash storage free ATM transaction mechanism improves utilization of processing and communication resources while improving transaction security, such as by generating electronic cash/banking-related transaction requests, causing to transmit and/or process such electronic transaction requests for approval, as well as causing to receive, process and dispense to customers authenticated cash bills based on the various transaction requests. Moreover, the processing and transactions enabled by the novel POS terminal device features and functionality herein provide improved convenience, efficiency, security, and availability of such cash transactions; and reduces likelihood of customers unable to access or obtain, or scrambling for cash due to the absence or non-operation of a nearby ATM, thereby reducing or eliminating the need for unnecessary, inefficient and/or non-secure cash withdrawal and/or deposit transactions.

Figure 5:
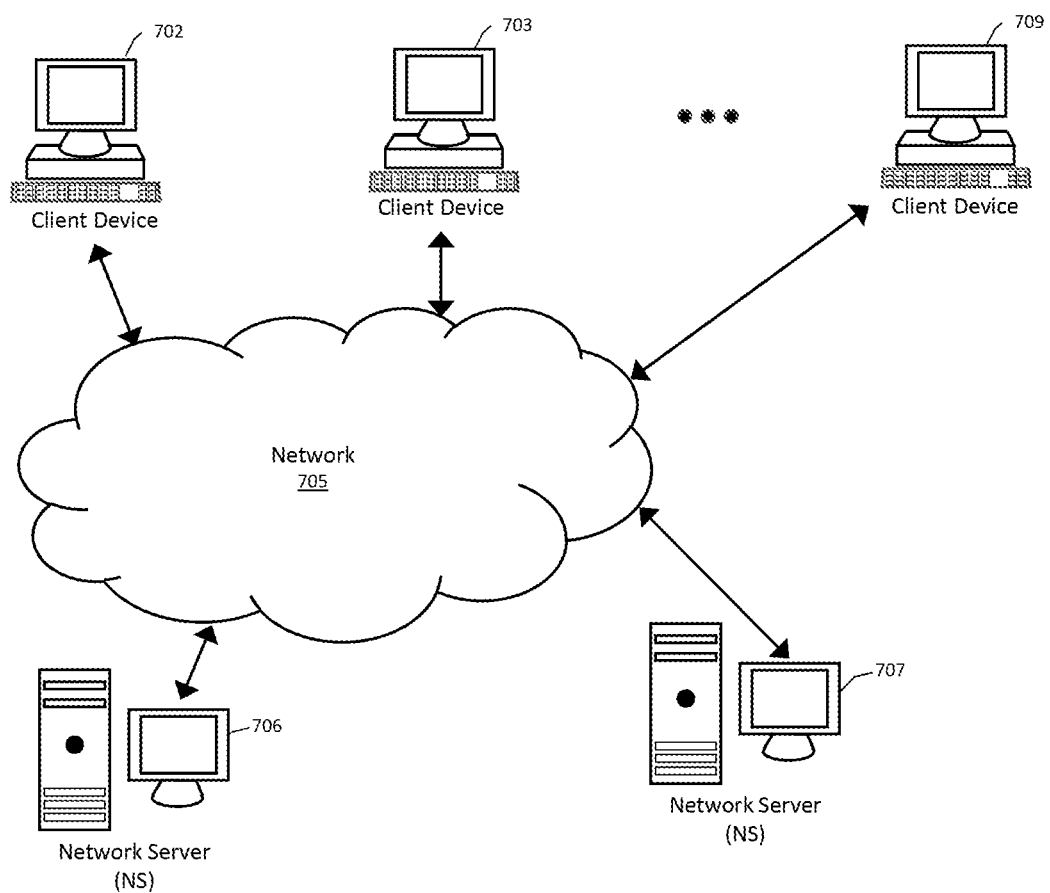
FIG. 5 is a block diagram depicting an exemplary computer-based system and/or platform, in accordance with certain embodiments of the present disclosure.

FIG. 5 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of instances of software applications, users, and/or concurrent transactions, as detailed herein. In some embodiments, the exemplary computer-based system/platform may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 5, clients such as client devices 702 through 709 (e.g., POS devices and/or client computing devices, etc.) of the exemplary computer-based system/platform may include virtually any computing device capable of receiving and sending communications over a network (e.g., cloud network, etc.), such as network 705, to and from another computing device, such as servers 706 and 707, each other, and the like. In some embodiments, the member devices 702 through 709 may be POS (point of sale, point of service, etc.) devices, personal computers, multiprocessor systems, microprocessor-based or programmable consumer electronics, network PCs, and the like. In some embodiments, one or more devices within client devices 702 through 709 may include computing devices that typically connect via wired connection and/or wireless communications media such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more client devices of client devices 702 through 709 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within client devices 702 through 709 may include may run one or more applications, such as Internet browsers, mobile applications, voice calls, video games, videoconferencing, and email, among others. In some embodiments, one or more member clients of client devices 702 through 709 may be configured to receive and to send web pages, and the like. In some embodiments, an exemplary specifically programmed browser applications, such as any associated with online transactions of the present disclosure, may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a client device of client devices 702 through 709 may be specifically programmed by either Java, .Net, QT, C, C++ and/or other suitable programming language. In some embodiments, one or more client devices within client devices 702 through 709 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, one or both of the exemplary server 706 and/or the exemplary server 707 may be a web server (or a series of servers) running a network operating system, examples of which may include but are not limited to Microsoft Windows Server, Novell NetWare, or Linux. In some embodiments, the exemplary server 706 and/or the exemplary server 707 may be used for and/or provide cloud and/or network computing. Although not shown in FIG. 5, in some embodiments, the exemplary server 706 and/or the exemplary server 707 may have connections to external systems like email, SMS messaging, text messaging, ad content providers, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the client devices 702 through 709.

In some embodiments and, optionally, in combination of any embodiment described above or below, for example, one or more exemplary client devices 702 through 709, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 6:
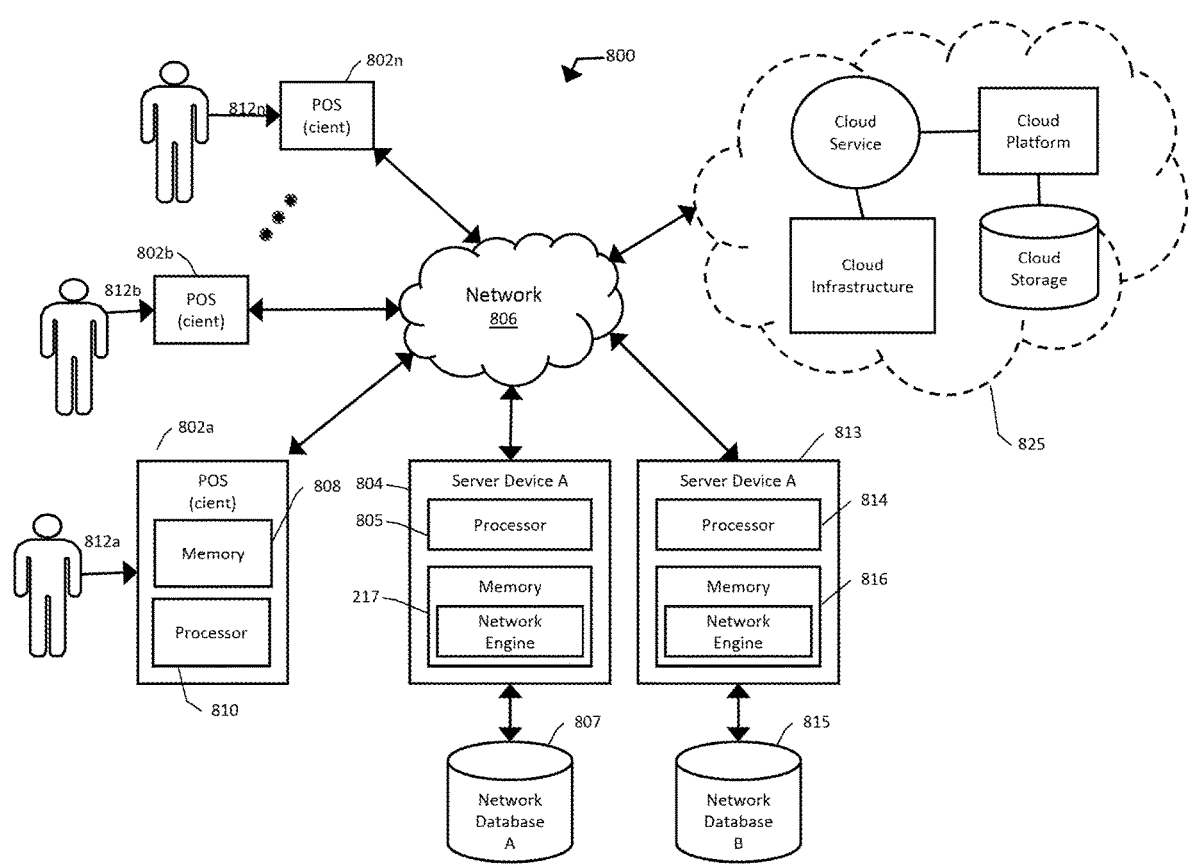
FIG. 6 is a block diagram depicting another exemplary computer-based system and/or platform, in accordance with certain embodiments of the present disclosure.

FIG. 6 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the client or member computing devices 802a, 802b through 802n shown each at least includes a storage and/or computer-readable media component 808, which may include memory such as random-access memory (RAM), coupled to a processor 810. In some embodiments, the processor 810 may execute computer-executable program instructions stored in such storage and/or media 808. In some embodiments, the processor 810 may include a microprocessor, an ASIC, and/or a state machine. In some embodiments, the processor 810 may include, or may be in communication with, media, for example computer-readable media (at 808 and/or elsewhere), which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of any such client, with computer-readable instructions. In some embodiments, other examples of suitable media may include, but are not limited to, CD-ROM, DVD, magnetic disk, memory chip, ROM, RAM, an ASIC, a configured processor, all optical media, other disk storage, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, etc.

In some embodiments, client computing devices 802a through 802n may also comprise a number of external or internal devices such as a mouse, a CD-ROM, DVD, a physical or virtual keyboard, a display, or other input or output devices. In some embodiments, examples of client computing devices 802a through 802n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, client computing devices 802a through 802n may be specifically programmed with one or more application programs in accordance with one or more principles/methodologies detailed herein. In some embodiments, client computing devices 802a through 802n may operate on any operating system capable of supporting a browser or browser-enabled application, such as Microsoft™, Windows™, and/or Linux. In some embodiments, client computing devices 802a through 802n shown may include, for example, personal computers executing a browser application program such as Microsoft Corporation's Internet Explorer™, Apple Computer, Inc.'s Safari™, Mozilla Firefox, and/or Opera. In some embodiments, through the client computing client devices 802a through 802n, users, 812a through 812n, may communicate over the exemplary network 806 with each other and/or with other systems and/or devices coupled to the network 806. As shown in FIG. 6, exemplary server devices 804, 813 and, in some embodiments, one or more cloud components 825 may be also coupled to the network 806. In some embodiments, one or more client computing devices 802a through 802n may be mobile clients.

In some embodiments, at least one database of exemplary databases 807 and 815, such as those implemented in connection with the server(s) 101, the fraudulent bill database, etc., may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
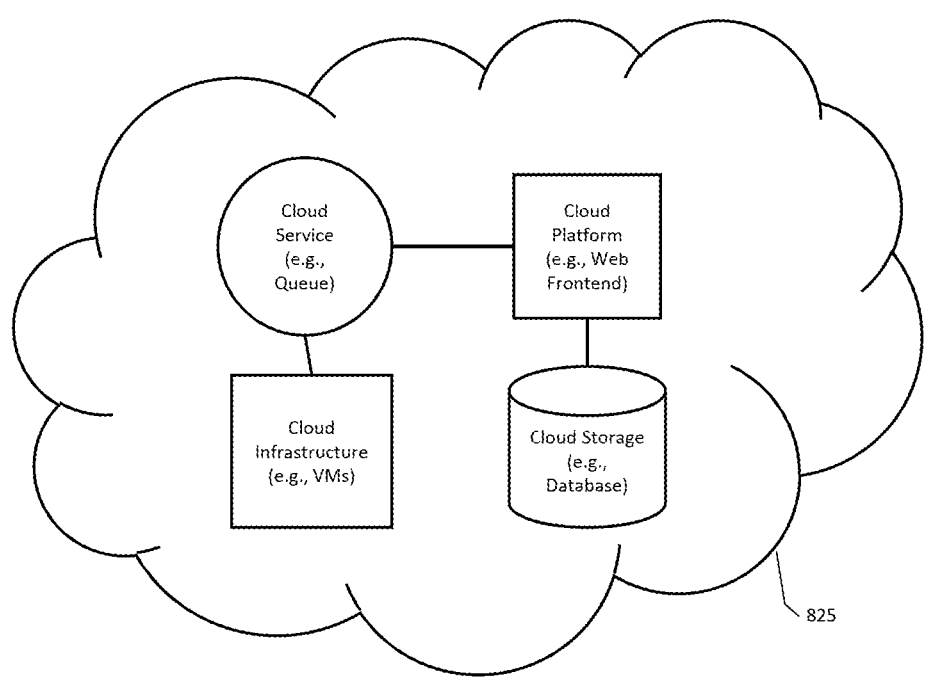
FIGS. 7 and 8 are diagrams illustrating two exemplary implementations of cloud computing architecture/aspects with respect to which various technological applications may be specifically configured to operate, in accordance with certain embodiments of the present disclosure.

As also shown in FIGS. 6 and 7, some embodiments of the present disclosure may also include and/or involve one or more cloud components 825, which are shown grouped together in the drawing for sake of illustration, though may be distributed in various ways as known in the art. Cloud components 825 may include one or more cloud services such as software applications (e.g., related to the online service, etc.), one or more cloud platforms (e.g., a Web front-end, etc.), cloud infrastructure (e.g., virtual machines, etc.), and/or cloud storage (e.g., cloud databases, etc.).

Figure 8:
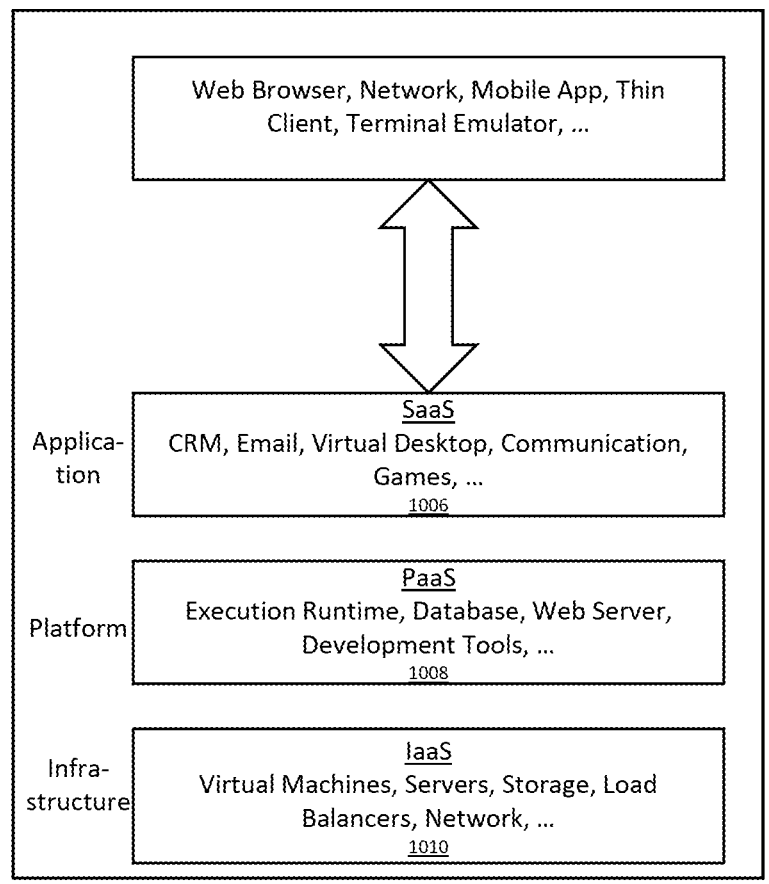

According to some embodiments shown by way of one example in FIG. 8, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 6-8 illustrate diagrams that illustrate aspects of exemplary implementations of the cloud computing/architecture(s) in which the exemplary inventive computer-based systems/platforms, the exemplary inventive computer-implemented methods, and/or the exemplary inventive computer-based devices, components and media of the present disclosure may be specifically configured to operate. In some embodiments, such cloud architecture 1006, 1008, 1010 may be utilized in connection with the network communication aspects, e.g. as shown at 1004, to achieve various technological applications described herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "automatically," and its logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, exemplary inventive, specially programmed computing systems/platforms with associated devices, and circuitry of transaction cards 110 herein are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include POS terminal devices and/or transaction cards or devices that involve wireless, e.g., Bluetooth™ and/or NFC, circuitry and/or communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/

PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., as shown in FIGS. 6-8) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems of the present disclosure may be implemented across one or more of various computer platforms such as, but not limited to: (1) Linux, (2) Microsoft Windows, (3) OS X (Mac OS), (4) Solaris, (5) UNIX (6) VM, (7) Android, (8) Java Platforms, (9) Open Web Platform, or other suitable computer platforms.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

Clause 1. A merchant device and/or POS terminal device for a cash-only retail location comprising:
  a housing, comprising:
    a cash storage receptacle configured to store authenticated cash bills received at the cash-only retail location;
    a cash management component comprising:
      a reader component for interacting with a transaction card or a transacting device presented, by a respective customer of a plurality of customers of the cash-only retail location, at the POS terminal device to allow to the customer to submit or withdraw the authenticated cash bills so as to deposit a corresponding monetary amount to or withdraw the corresponding monetary amount from a respective customer account associated with the respective customer at a respective financial entity;

a cash bills intake component, configured to receive or expel cash bills;

an authentication component configured to scan, authenticate, accept and reject cash bills so as to confirm that the cash storage receptacle houses only the authenticated cash bills;

a cash bills dispensing component, configured to dispense the authenticated cash bills;

wherein the cash management component is configured to:

receive a respective cash withdrawal request or a respective cash deposit request from the respective customer of the plurality of customers of the cash-only retail location, generate a respective electronic cash transaction request based on the respective cash withdrawal request or the respective cash deposit request, cause to transmit the respective electronic cash transaction request, through a computer network, from the POS terminal device to an electronic account management computer associated with the respective financial entity, receive a respective cash transaction approval from the electronic account management computer associated with the respective financial entity based on the respective electronic cash transaction request, record the corresponding monetary amount of the authenticated cash bills to be stored in or dispensed from the cash storage receptacle, based on the respective cash deposit request or the respective cash withdrawal request, cause to dispense, through the cash bills dispensing component, to the respective customer, the authenticated cash bills, based on the respective cash withdrawal request; and a communication component, having a network connection with the computer network and configured to transmit the respective electronic cash transaction request, through the computer network, from the POS terminal device of the cash-only retail location to the electronic account management computer associated with the respective financial entity.

Clause 2. The POS terminal device of clause 1 or any clause herein, wherein the authentication component further comprises:

an imaging device configured to capture records of the cash bills stored in and dispensed from the housing.

Clause 3. The POS terminal device of clause 2 or any clause herein, wherein the imaging device is configured to scan a check presented by the user for deposit or use in a transaction with the POS terminal device.

Clause 4. The POS terminal device of clause 3 or any clause herein, wherein the cash management component is configured to:

debit, in response to the user request for a check deposit, an account associated with the user for at least some of an amount of the check presented by the user for deposit.

Clause 5. The POS terminal device of clause 3 or any clause herein, wherein the cash management component is configured to:

issue, in response to the user request for the check deposit, cash to the user in an amount no greater than the amount of the check deposit.

Clause 6. The POS terminal device of clause 1 or any clause herein, wherein the cash management component is configured for executing a direct debit transaction, comprising the cash withdrawal request, without involving any intervening credit card processing components or requirements.

Clause 7. The POS terminal device of clause 1 or any clause herein, wherein the POS terminal device is configured for issuing cash to the user for the cash withdrawal without the user performing any other transaction with the POS terminal device or at the cash-only retail location.

Clause 8. The POS terminal device of clause 1 or any clause herein, wherein one or both of the imaging device and the cash management component are further configured to:

scan the cash bills being stored in or dispensed from the housing to perform one or more checks related to verifying authenticity or determining counterfeit status thereof.

Clause 9. The POS terminal device of clause 1 or any clause herein, wherein the cash management component is further configured to:

track revenue information associated with cash transactions made at the cash-only retail location.

Clause 10. The POS terminal device of clause 1 or any clause herein, wherein the reader component is configured for reading one or more of a contact transaction card, a contactless transaction card, a wireless payment transaction card, a smartphone, and other mobile transacting devices.

Clause 11. A method comprising:

storing, by a cash storage receptacle of a POS terminal device at a cash-only retail location, authenticated cash bills received at the cash-only retail location;

reading, by a reader component of the POS terminal device, a transaction card or a transacting device presented, by a respective customer of a plurality of customers of the cash-only retail location, at the POS terminal device to allow to the customer to submit or withdraw the authenticated cash bills from a respective customer account associated with the respective customer at a respective financial entity;

scanning and authenticating, by an authentication component of the POS terminal device, cash bills as the authenticated cash bills so as to confirm that the cash storage receptacle has only the authenticated cash bills;

accepting, by a cash bills intake component of the POS terminal device, the cash bills;

dispensing, by a cash bills dispensing component of the POS terminal device, the authenticated cash bills; and operating a cash management component of the POS terminal device to:

receive a respective cash withdrawal request or a respective cash deposit request from the respective customer of the plurality of customers of the cash-only retail location, generate a respective electronic cash transaction request based on the respective cash withdrawal request or the respective cash deposit request, cause to transmit the respective electronic cash transaction request, by a communication component of the POS terminal device, through a computer network, from the POS terminal device to an electronic account management computer associated with the respective financial entity, receive a respective cash transaction approval from the electronic account management computer associated with the respective financial entity based on the respective electronic cash transaction request, record the authenticated cash bills to be stored in the cash storage receptacle, based on the respective cash deposit request, and cause to dispense, through the cash bills dispensing component, to the respective customer, the authenticated cash bills, based on the respective cash withdrawal request.

Clause 12. The method of clause 11 or any clause herein, further comprising:

capturing, by an imaging device of the POS terminal device, records of the cash bills stored in and dispensed from the housing.

Clause 13. The method of clause 12 or any clause herein, further comprising:

scanning, by the imaging device, a check presented by the user for deposit or use in a transaction with the POS terminal device.

Clause 14. The method of clause 13 or any clause herein, further comprising:

debiting, by the cash management component, in response to the user request for a check deposit, an account associated with the user for at least some of an amount of the check presented by the user for deposit.

Clause 15. The method of clause 13 or any clause herein, further comprising:

issuing, by the cash management component, in response to the user request for the check deposit, cash to the user in an amount no greater than the amount of the check deposit.

Clause 16. The method of clause 11 or any clause herein, further comprising:

executing, by the cash management component, a direct debit transaction comprising the cash withdrawal request, without involving any intervening credit card processing components or requirements.

Clause 17. The method of clause 11 or any clause herein, further comprising:

issuing, by the POS terminal device, cash to the user for the cash withdrawal without the user performing any other transaction with the POS terminal device or at the cash-only retail location.

Clause 18. The method of clause 11 or any clause herein, further comprising:

scanning, by one or both of the imaging device and the cash management component, the cash bills being stored in or dispensed from the POS terminal device to perform one or more checks related to verifying authenticity or determining counterfeit status thereof.

Clause 19. The method of clause 11 or any clause herein, further comprising:

tracking, by the cash management component, revenue information associated with cash transactions made at the cash-only retail location.

Clause 20. The method of clause 11 or any clause herein, further comprising:

reading, by the reader component, one or more of a contact transaction card, a contactless transaction card, a wireless payment transaction card, a smartphone, and other mobile transacting devices.

Clause 21. Embodiments herein may also take the form of a system comprised of computing elements that are arranged, programmed and/or otherwise adapted to perform the features and functionality set forth anywhere above.

Clause 22. In addition, embodiments herein may also take the form of one or more computer readable media containing computer-executable instructions for performing any of the processing herein, the computer-executable instructions being executable via one or more processing components to process instructions and/or perform one or more aspects of the functionality set forth herein.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A point of service (POS) terminal device for a cash-only retail location, the POS terminal device comprising:

a housing, comprising:

a cash storage receptacle configured to store authenticated cash bills received at the cash-only retail location;

a cash management component comprising:

a reader component for interacting with a transaction card or a transacting device presented, by a respective customer of a plurality of customers of the cash-only retail location, at the POS terminal device to allow to the customer to submit or withdraw the authenticated cash bills so as to deposit a corresponding monetary amount to or withdraw the corresponding monetary amount from a respective customer account associated with the respective customer at a respective financial entity;

a cash bills intake component, configured to receive or expel the cash bills;

a cash bill sanitizer, the cash bill sanitizer configured to sanitize the cash bills received via the cash bill intake component and/or cash bills dispensed from the housing;

an authentication component configured to scan, authenticate, accept and reject cash bills so as to confirm that the cash storage receptacle houses only the authenticated cash bills, the authentication component comprising an imaging device configured to capture records of the cash bills stored in and dispensed from the housing, wherein the imaging device is configured to scan a check presented by the user for deposit or use in a transaction with the POS terminal device;

a cash bills dispensing component, configured to dispense the authenticated cash bills;

wherein the cash management component is configured to:

receive a respective cash withdrawal request or a respective cash deposit request from the respective customer of the plurality of customers of the cash-only retail location, generate a respective electronic cash transaction request based on the respective cash withdrawal request or the respective cash deposit request, cause to transmit the respective electronic cash transaction request, through a computer network, from the POS terminal device to an electronic account management computer associated with the respective financial entity, receive a respective cash transaction approval from the electronic account management computer associated with the respective financial entity based on the respective electronic cash transaction request, record the corresponding monetary amount of the authenticated cash bills to be stored in or dispensed from the cash storage receptacle, based on the respective cash deposit request or the respective cash withdrawal request, cause to dispense, through the cash bills dispensing component, to the respective customer, the authenticated cash bills, based on the respective cash withdrawal request, wherein the imaging device and the cash management component are further configured to scan the cash bills being stored in or dispensed from the housing to perform checks related to verifying authenticity and determining counterfeit status thereof;

debit, in response to the user request for a check deposit, an account associated with the user for at least some of an amount of the check presented by the user for deposit; and issue, in response to the user request for a check deposit, cash to the user in an amount no greater than the amount of the check deposit; and a communication component, having a network connection with the computer network and configured to transmit the respective electronic cash transaction request, through the computer network, from the POS terminal device of the cash-only retail location to the electronic account management computer associated with the respective financial entity;

wherein the cash management component is configured for executing a direct debit transaction, comprising the cash withdrawal request; and wherein the POS terminal device is configured for issuing cash to the user for the cash withdrawal:
without the user performing any other transaction with the POS terminal device or at the cash-only retail location; and
without involving any intervening credit card processing components or requirements to complete the direct debit transaction.

2. The POS terminal device of claim 1, wherein the imaging device is configured to scan a check presented by the user for deposit or use in a transaction with the POS terminal device.

3. The POS terminal device of claim 2, wherein the cash management component is configured to:
debit, in response to the user request for a check deposit, an account associated with the user for at least some of an amount of the check presented by the user for deposit; and
issue, in response to the user request for a check deposit, cash to the user in an amount no greater than the amount of the check deposit.

4. The POS terminal device of claim 1 wherein the POS terminal device is configured for issuing cash to the user for the cash withdrawal without the user performing any other transaction with the POS terminal device or at the cash-only retail location.

5. The POS terminal device of claim 1, wherein the cash management component is further configured to:
track revenue information associated with cash transactions made at the cash-only retail location.

6. The POS terminal device of claim 1, wherein the reader component is configured for reading one or more of a contact transaction card, a contactless transaction card, a wireless payment transaction card, a smartphone, and other mobile transacting devices.

7. The POS terminal device of claim 1, wherein the cash management component is configured to:
issue, in response to the user request for a check deposit, cash to the user in an amount no greater than the amount of the check deposit.

8. The POS terminal device of claim 7, wherein the cash management component is configured to:
debit, in response to the user request for a check deposit, an account associated with the user for at least some of an amount of the check presented by the user for deposit.

9. The POS terminal device of claim 8, wherein the cash management component is configured to:
issue, in response to the user request for a check deposit, cash to the user in an amount no greater than the amount of the check deposit.

10. The POS terminal device of claim 9, wherein an amount of the debit transaction is credited to a bank account of a user associated with the POS terminal device.

11. The POS terminal device of claim 9, wherein the cash management component is configured to:
debit, in response to the user request for a check deposit, an account associated with the user for at least some of an amount of the check presented by the user for deposit.

12. The POS terminal device of claim 7, wherein the cash management component is configured to:
issue, in response to the user request for a check deposit, cash to the user in an amount no greater than the amount of the check deposit.

13. A method comprising:
storing, by a cash storage receptacle of a point of service (POS) terminal device at a cash-only retail location, authenticated cash bills received at the cash-only retail location;

reading, by a reader component of the POS terminal device, a transaction card or a transacting device presented, by a respective customer of a plurality of customers of the cash-only retail location, at the POS terminal device to allow to the customer to submit or withdraw the authenticated cash bills so as to deposit a corresponding money amount to or withdraw the corresponding money amount from a respective customer account associated with the respective customer at a respective financial entity;

scanning and authenticating, by an authentication component of the POS terminal device, cash bills as the authenticated cash bills so as to confirm that the cash storage receptacle has only the authenticated cash bills, wherein the authentication component comprises an imaging device configured to capture records of the cash bills stored in and dispensed from the housing, wherein the imaging device is configured to scan a check presented by the user for deposit or use in a transaction with the POS terminal device, and, in response to the user request for a check deposit:
debiting an account associated with the user for at least some of an amount of the check presented by the user for deposit; and
issuing cash to the user in an amount no greater than the amount of the check deposit;
accepting, by a cash bills intake component of the POS terminal device, the cash bills;
dispensing, by a cash bills dispensing component of the POS terminal device, the authenticated cash bills;
sanitizing, by a cash bill sanitizer component of the POS terminal device, the cash bills received via the cash bill intake component and/or the cash bills dispensed from the POS terminal device; and
operating a cash management component of the POS terminal device to:
receive a respective cash withdrawal request or a respective cash deposit request from the respective customer of the plurality of customers of the cash-only retail location,
generate a respective electronic cash transaction request based on the respective cash withdrawal request or the respective cash deposit request,
cause to transmit the respective electronic cash transaction request, by a communication component of the POS terminal device, through a computer network, from the POS terminal device to an electronic account management computer associated with the respective financial entity,
receive a respective cash transaction approval from the electronic account management computer associated with the respective financial entity based on the respective electronic cash transaction request,
record one or both of the corresponding money amount and/or serial number or authentication information of the authenticated cash bills to be stored in or dispensed from the cash storage receptacle, based on the respective cash deposit request or the respective cash withdrawal request, and
cause to dispense, through the cash bills dispensing component, to the respective customer, the authenticated cash bills, based on the respective cash withdrawal request;
wherein, as a function of the operations of the cash management component, the authenticated cash bills are issued to the user for the cash withdrawal without the user performing any other transaction with the POS terminal device or at the cash-only retail location;

wherein the cash management component is further configured to scan the cash bills being stored in or dispensed from the housing to perform checks related to verifying authenticity and determining counterfeit status thereof;
wherein the cash management component is configured for executing a direct debit transaction, comprising the cash withdrawal request; and
wherein the POS terminal device is configured for issuing cash to the user for the cash withdrawal:
without the user performing any other transaction with the POS terminal device or at the cash-only retail location; and
without involving any intervening credit card processing components or requirements to complete the direct debit transaction.

14. The method of claim 13 further comprising:
capturing, by an imaging device of the POS terminal device, records of the cash bills stored in and dispensed from the housing.

15. The method of claim 14, further comprising:
scanning, by the imaging device, a check presented by the user for deposit or use in a transaction with the POS terminal device.

16. The method of claim 15, further comprising:
debiting, by the cash management component, in response to the user request for a check deposit, an account associated with the user for at least some of an amount of the check presented by the user for deposit.

17. The method of claim 16, further comprising:
issuing, by the cash management component, in response to the user request for the check deposit, cash to the user in an amount no greater than the amount of the check deposit.

18. The method of claim 13, further comprising:
tracking, by the cash management component, revenue information associated with cash transactions made at the cash-only retail location.

19. The method of claim 13, further comprising:
reading, by the reader component, one or more of a contact transaction card, a contactless transaction card, a wireless payment transaction card, a smartphone, and other mobile transacting devices.

20. The method of claim 13, further comprising:
scanning, by the imaging device, a check presented by the user for deposit or use in a transaction with the POS terminal device.

* * * * *